US012760650B2

(12) United States Patent
Hiratsuka et al.

(10) Patent No.: US 12,760,650 B2
(45) Date of Patent: Oct. 13, 2026

(54) EXCAVATED MATTER CONVEYANCE SYSTEM INSIDE DRIFTWAY

(71) Applicant: Komatsu Ltd., Tokyo (JP)

(72) Inventors: Keigo Hiratsuka, Tokyo (JP); Kazunari Kawai, Tokyo (JP); Shinichi Terada, Tokyo (JP); Masaaki Uetake, Tokyo (JP)

(73) Assignee: KOMATSU LTD., Tokyo (JP)

( * ) Notice: Subject to any disclaimer, the term of this patent is extended or adjusted under 35 U.S.C. 154(b) by 195 days.

(21) Appl. No.: 18/702,011

(22) PCT Filed: Nov. 1, 2022

(86) PCT No.: PCT/JP2022/040875
§ 371 (c)(1),
(2) Date: Sep. 17, 2024

(87) PCT Pub. No.: WO2023/085173
PCT Pub. Date: May 19, 2023

(65) Prior Publication Data

US 2025/0314173 A1 Oct. 9, 2025

(30) Foreign Application Priority Data

Nov. 15, 2021 (JP) ................................ 2021-185567

(51) Int. Cl.
*E21F 13/02* (2006.01)
*B65G 41/00* (2006.01)
*E21F 13/08* (2006.01)

(52) U.S. Cl.
CPC .......... *E21F 13/083* (2013.01); *B65G 41/008* (2013.01); *E21F 13/02* (2013.01)

(58) Field of Classification Search
CPC ........ E21F 13/02; E21F 13/083; B65G 21/14; B60P 1/36; E21D 9/12
See application file for complete search history.

(56) References Cited

U.S. PATENT DOCUMENTS 3,191,754 A * 6/1965 Heimaster ............... E21F 13/02 198/303
4,691,863 A * 9/1987 Smith ....................... E01C 9/04 238/8

(Continued)

FOREIGN PATENT DOCUMENTS

AU 643872 B2 11/1993
JP H08-086192 A 4/1996

(Continued)

*Primary Examiner* — Carib A Oquendo
(74) *Attorney, Agent, or Firm* — Troutman Pepper Locke LLP; James E. Armstrong, IV; Joshua L. Jones

(57) ABSTRACT

This excavated matter conveyance system inside a driftway includes a first vehicle that is capable of traveling inside a driftway, a first conveyor that is supported by an upper portion of the first vehicle and is capable of conveying excavated matter in a first conveyance direction intersecting an upward-downward direction of the first vehicle, a second vehicle that is coupled to the first vehicle in a swingable manner, a second conveyor that is supported by an upper portion of the second vehicle and is capable of conveying the excavated matter in a second conveyance direction intersecting an upward-downward direction of the second vehicle, and movement apparatuses that are capable of relatively moving the first conveyor and the second conveyor.

11 Claims, 13 Drawing Sheets

(56) References Cited

U.S. PATENT DOCUMENTS

| | | | | | |
|---|---|---|---|---|---|
| 5,363,972 | A * | 11/1994 | Gilmore | B07B 13/16 209/930 |
| 6,276,758 | B1 * | 8/2001 | Hoffmann | E02F 7/02 180/89.15 |
| 2009/0133599 | A1 * | 5/2009 | Aitken | B61F 5/301 105/168 |
| 2022/0162941 | A1 * | 5/2022 | Morrison | G05D 1/617 |

FOREIGN PATENT DOCUMENTS

| | | | |
|---|---|---|---|
| JP | H11-141277 | A | 5/1999 |
| JP | 2001-082100 | A | 3/2001 |
| JP | 2001-152789 | A | 6/2001 |
| JP | 2010-242382 | A | 10/2010 |
| JP | 2014-066025 | A | 4/2014 |
| JP | 2016-169514 | A | 9/2016 |

* cited by examiner

EXCAVATED MATTER CONVEYANCE SYSTEM INSIDE DRIFTWAY

TECHNICAL FIELD

The present invention relates to an excavated matter conveyance system inside a driftway.

The present invention claims priority based on 2021-185567, filed Nov. 15, 2021, the content of which is incorporated herein by reference.

BACKGROUND ART

Patent Document 1 discloses the following as methods for dumping excavation muck in a tunnel boring machine (TBM) for rock excavation.

(1) A method for laying tracks inside a tunnel and performing dumping using a muck transportation trolley traveling on the tracks.

(2) A method for laying tracks inside a tunnel and performing dumping using a shuttle car traveling on the tracks.

(3) A method for performing dumping using a continuous belt conveyor which is automatically drawn out as drivage progresses.

Among those above, the method for performing dumping using a continuous belt conveyor is disclosed in Patent Document 2. Patent Document 2 discloses a method in which a following carriage is entrained on rails laid behind a tunnel boring machine and muck excavated by the tunnel boring machine is transported to the side behind the following carriage using a belt conveyor supported by an upper portion of the following carriage. In Patent Document 2, the belt conveyor is provided in a manner of extending to the rear side beyond the following carriage. A section length of the belt conveyor is variable in a longitudinal direction of a tunnel. A projecting section of the belt conveyor, which is provided in a manner of extending further rearward from the following carriage, is supported in a shared manner by a conveyor receiving carriage and a muck car.

RELATED ART DOCUMENT

Patent Document

[Patent Document 1]
Japanese Unexamined Patent Application, First Publication No. 2001-82100
[Patent Document 2]
Japanese Unexamined Patent Application, First Publication No. 2001-152789

SUMMARY

Problems to be Solved by the Invention

However, with a structure in which a projecting section of a belt conveyor is supported in a shared manner by a conveyor receiving carriage and a muck car, when a vehicle travels in a curved tunnel, it is difficult to cope with the curved part of the tunnel. For this reason, there is room for improvement in efficiently conveying excavated matter even inside a driftway including a curved driftway.

Hence, an object of the present invention is to provide an excavated matter conveyance system inside a driftway capable of efficiently conveying excavated matter even inside a driftway including a curved driftway.

Means for Solving the Problem

An excavated matter conveyance system inside a driftway according to an aspect of the present invention includes a first vehicle that is capable of traveling inside a driftway, a first conveyor that is supported by an upper portion of the first vehicle and is capable of conveying excavated matter in a first conveyance direction intersecting an upward-downward direction of the first vehicle, a second vehicle that is coupled to the first vehicle in a swingable manner, a second conveyor that is supported by an upper portion of the second vehicle and is capable of conveying the excavated matter in a second conveyance direction intersecting an upward-downward direction of the second vehicle, and movement apparatuses that are capable of relatively moving the first conveyor and the second conveyor.

Advantage of the Invention

According to the foregoing aspect, it is possible to efficiently convey excavated matter even inside a driftway including a curved driftway.

DESCRIPTION OF THE EMBODIMENTS

Hereinafter, embodiments of the present invention will be described with reference to the drawings. In the embodiments, as an example of an excavated matter conveyance system inside a driftway, an example of a system that travels along rails inside a driftway including a curved driftway and conveys excavated matter such as excavation muck will be described.

First Embodiment

Excavated Matter Conveyance System

Figure 1:
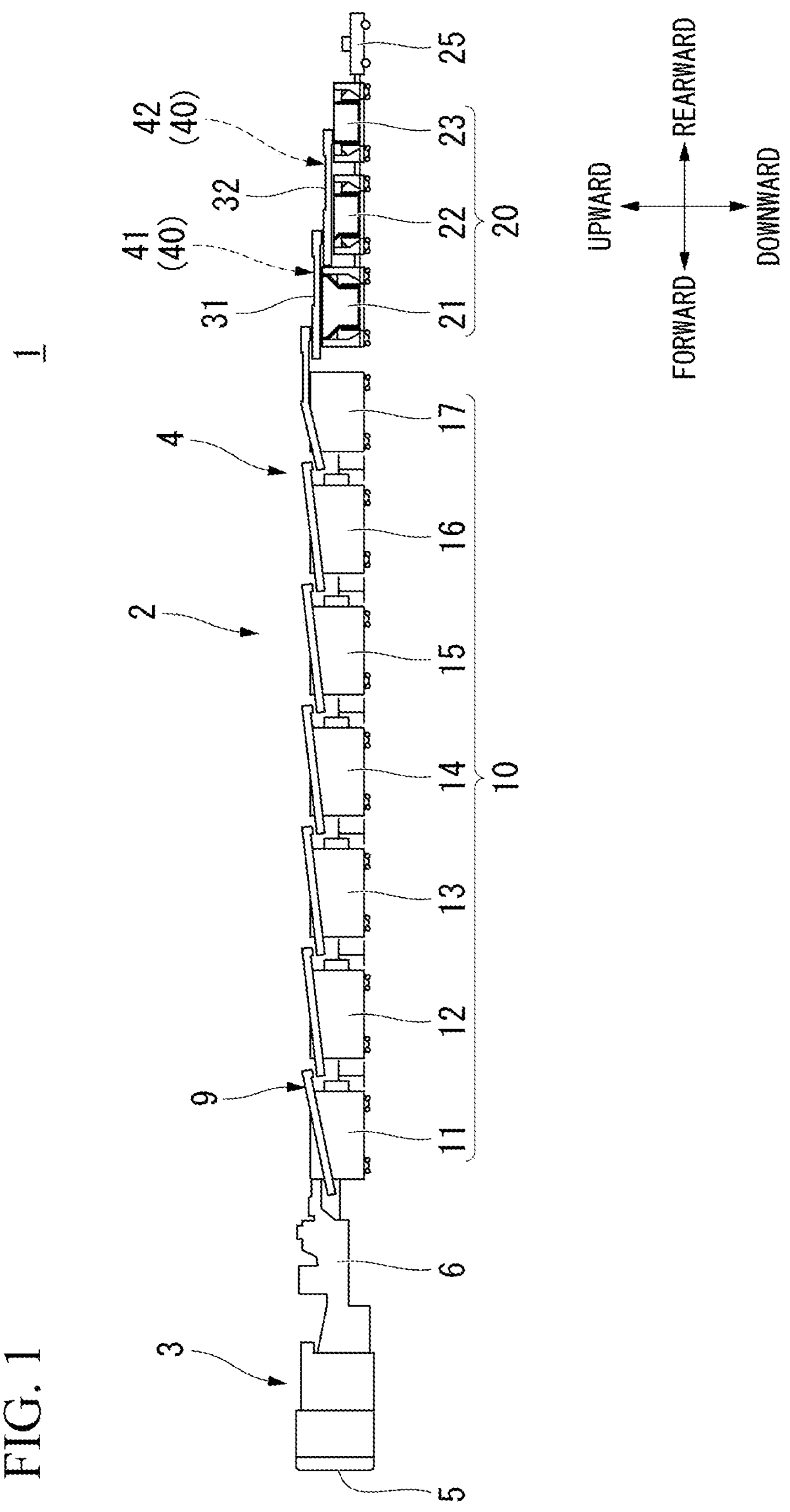
FIG. 1 is a side view of an excavated matter conveyance system inside a driftway according to a first embodiment.

FIG. 1 is a side view of an excavated matter conveyance system inside a driftway according to a first embodiment.

As shown in FIG. 1, an excavated matter conveyance system 1 includes an excavation conveyance vehicle 2 that excavates and conveys excavated matter. The excavation conveyance vehicle 2 extends in a forward-rearward direction. The excavation conveyance vehicle 2 includes an excavator 3 and a following carriage group 4.

For example, the excavator 3 is a tunnel boring machine (TBM) for rock excavation. The excavator 3 is disposed on a working face (excavation) side in the excavation conveyance vehicle 2. The excavator 3 includes a cutter head 5 that can rotate around a predetermined axis. The excavator 3 excavates bedrock or the like by rotation of the cutter head 5. A front-end portion of a towing beam 6 is connected to the excavator 3. A rear end portion of the towing beam 6 is connected to a front-end portion of a forefront following carriage.

Hereinafter, a direction in which the vehicle proceeds while the excavator 3 is excavating will be referred to as "a direction toward a side in front of the vehicle", and a direction opposite to the side in front of the vehicle will be referred to as a direction toward a side behind the vehicle. A side of the right hand with respect to the direction in which the vehicle proceeds while the excavator 3 is excavating will be referred to as a right side, and a side of the left hand with respect to the direction in which the vehicle proceeds while the excavator 3 is excavating will be referred to as a left side. A lateral direction of the vehicle will be referred to as "a width direction". An upward-downward direction of the vehicle is a direction orthogonal to the forward-rearward direction and the width direction of the vehicle. A lower side of the vehicle is a side where wheels are attached in the upward-downward direction of the vehicle. An upper side of the vehicle is a side opposite to the side where the wheels are attached in the upward-downward direction of the vehicle. In the example of the diagram, the vehicle is disposed on a horizontal surface. The upward-downward direction of the vehicle, a side above the vehicle, and a side below the vehicle respectively coincide with an upward-downward direction (vertical direction) in a state in which the vehicle is disposed on a horizontal surface, a vertically upward side, and a vertically downward side. In the following description, the reference sign L may be appended to the end of an element on the left side, and the reference sign R may be appended to the end of an element on the right side.

The following carriage group 4 includes a first conveyance vehicle group 10, a second conveyance vehicle group 20, and a tow car 25. Vehicles of the first conveyance vehicle group 10 and vehicles of the second conveyance vehicle group 20 are connected to each other by towing members such as a coupling rod and a towing bracket. The first conveyance vehicle group 10 and the second conveyance vehicle group 20 are not connected to each other by towing members.

The first conveyance vehicle group 10 is disposed between the excavator 3 and the second conveyance vehicle group 20. For example, the first conveyance vehicle group 10 may be equipped with an equipment storage area, an operator's seat, an oil tank, a hydraulic pump, a dust collector, a water treatment tank for the dust collector, a control panel, an inverter panel, a transformer, a cable storage area, and the like.

In the example of the diagram, the first conveyance vehicle group 10 is constituted of seven vehicles in total including a first vehicle 11 to a seventh vehicle 17. The first vehicle 11 is a forefront following carriage in the first conveyance vehicle group 10. The rear end portion of the towing beam 6 is connected to a front-end portion of the first vehicle 11.

Excavated matter excavated by rotation of the cutter head 5 is taken into a hopper (not shown) on a rear surface side of the cutter head 5. Excavated matter taken into the hopper is conveyed rearward by a belt conveyor 9. The belt conveyor 9 is supported by an upper portion or the like of the first conveyance vehicle group 10. The belt conveyor 9 extends from the hopper to a position above the first vehicle 11, then passes the first conveyance vehicle group 10 thereabove, and extends to a side behind a position above the seventh vehicle 17. Excavated matter conveyed by the belt conveyor 9 is conveyed to a conveyor supported by a forefront following carriage of the second conveyance vehicle group 20. In the example of the diagram, the belt conveyor 9 is divided between the carriages, and a belt conveyor having a rearward-rising inclination is mounted on each of the carriages so that excavated matter is sequentially conveyed.

Figure 2:
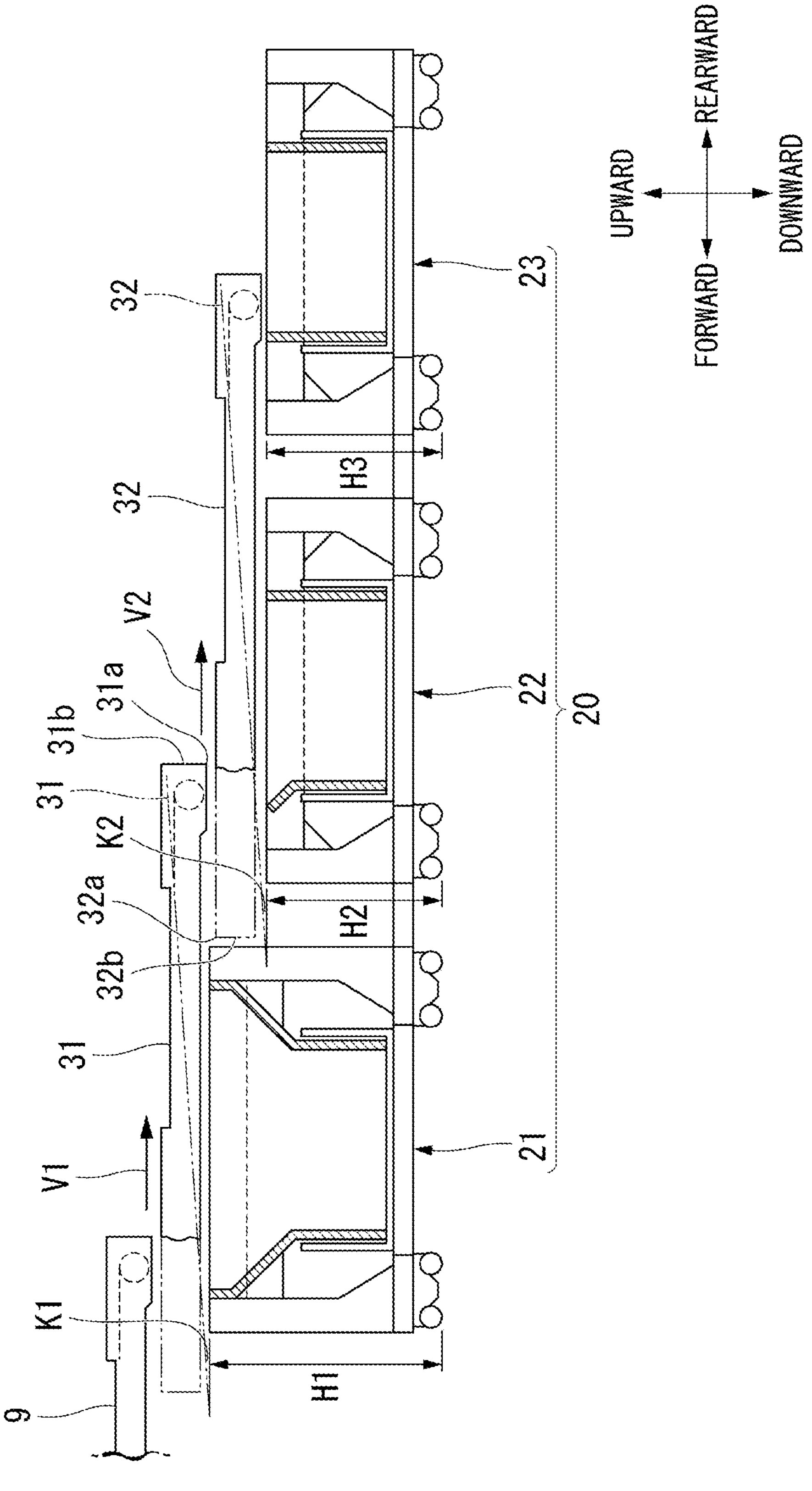
FIG. 2 is a side view of a second conveyance vehicle group according to the first embodiment.

FIG. 2 is a side view of a second conveyance vehicle group according to the first embodiment.

In the example of the diagram, the second conveyance vehicle group 20 is constituted of three vehicles in total. As shown in FIG. 2, the second conveyance vehicle group 20 includes a first vehicle 21, a second vehicle 22, and a third vehicle 23. The first vehicle 21 is a forefront following carriage of the second conveyance vehicle group 20. Excavated matter conveyed by the belt conveyor 9 is conveyed to a first conveyor 31 supported by the first vehicle 21. The first conveyor 31 is supported by an upper portion of the first vehicle 21. The first conveyor 31 can convey excavated matter in a first conveyance direction V1 orthogonal to the upward-downward direction of the first vehicle 21.

A height H1 of the first vehicle 21 is larger than a height H2 of the second vehicle 22. The height H1 of the first vehicle 21 denotes a length of the first vehicle 21 in the upward-downward direction from a lower end of wheels of the first vehicle 21 to an upper end of the first vehicle 21. The height H2 of the second vehicle 22 denotes a length of the second vehicle 22 in the upward-downward direction from a lower end of wheels of the second vehicle 22 to an upper end of the second vehicle 22.

The second vehicle 22 is coupled to the first vehicle 21 in a swingable manner. The upper end of the second vehicle 22 on the first vehicle 21 side is disposed below the upper end of the first vehicle 21 on the second vehicle 22 side. A second conveyor 32 is supported by an upper portion of the second vehicle 22. The second conveyor 32 can convey excavated matter in a second conveyance direction V2 orthogonal to the upward-downward direction of the second vehicle 22. In the second conveyor 32, an upper end 32*a* on the first vehicle 21 side is disposed below a lower end 31*a* of the first conveyor 31 on the second vehicle 22 side.

A lowermost stream end 31*b* of the first conveyor 31 in the first conveyance direction V1 is disposed on a side behind an uppermost stream end 32*b* of the second conveyor 32 in the second conveyance direction V2. In the example of the diagram, a state in which the first conveyor 31 has moved to the farthest downstream side in the first conveyance direction V1 is indicated by a solid line, and a state in which the second conveyor 32 has moved to the farthest upstream side in the second conveyance direction V2 is indicated by a two-dot dashed line.

A first inclination angle K1 formed by a surface of the first vehicle 21 which is orthogonal to the upward-downward direction and a conveyance surface on which the first conveyor 31 conveys excavated matter in the first conveyance direction V1 is the same angle as a second inclination angle K2 formed by a surface of the second vehicle 22 which is orthogonal to the upward-downward direction and a conveyance surface on which the second conveyor 32 conveys excavated matter in the second conveyance direction V2 (K1=K2). In the example of the diagram, the first conveyor 31 when the first inclination angle K1 is zero and the second conveyor 32 when the second inclination angle K2 is zero are indicated by solid lines, and the conveyance surface of the first conveyor 31 when the first inclination angle K1 is larger than zero (when having a rearward-rising inclination) and the conveyance surface of the second conveyor 32 when the second inclination angle K2 is larger than zero (when having a rearward-rising inclination) are indicated by two-dot dashed lines.

The third vehicle 23 is coupled to the second vehicle 22 in a swingable manner. A height H3 of the third vehicle 23 is the same as the height H2 of the second vehicle 22. The height H3 of the third vehicle 23 denotes a length of the third vehicle 23 in the upward-downward direction from a lower end of wheels of the third vehicle 23 to an upper end of the third vehicle 23. In the third vehicle 23, the upper end on the second vehicle 22 side is disposed at the same height as the upper end of the second vehicle 22 on the third vehicle 23 side.

Figure 3:
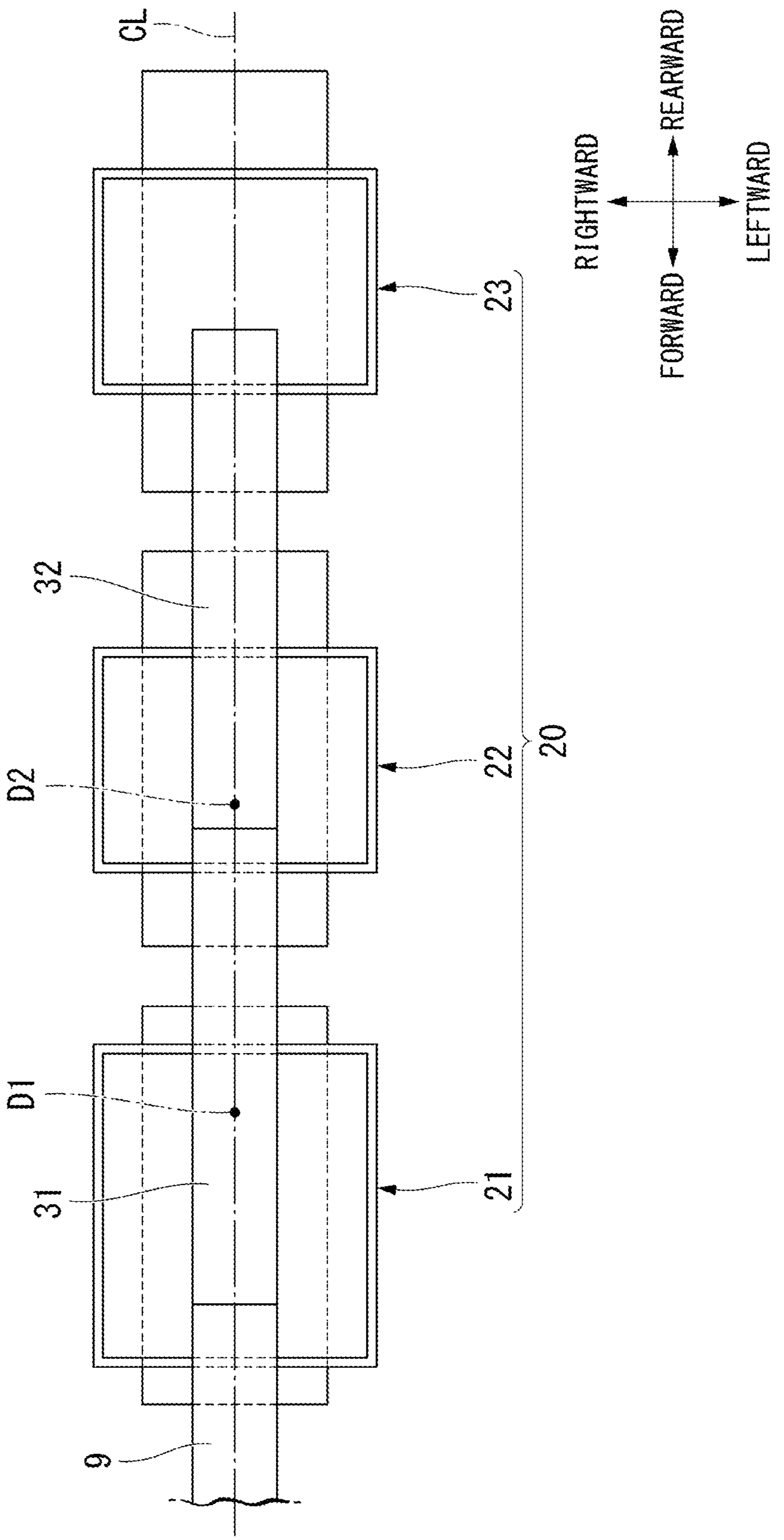
FIG. 3 is a top view of the second conveyance vehicle group according to the first embodiment.

FIG. 3 is a top view of the second conveyance vehicle group according to the first embodiment.

As shown in FIG. 3, each of the first vehicle 21, the second vehicle 22, and the third vehicle 23 has the same length in the width direction. In the example of the diagram, the first vehicle 21, the second vehicle 22, and the third vehicle 23 are arranged in the forward-rearward direction. Each of the belt conveyor 9, the first conveyor 31, and the second conveyor 32 has the same width in the width direction. The belt conveyor 9, the first conveyor 31, and the second conveyor 32 are shorter than the first vehicle 21, the second vehicle 22, and the third vehicle 23 in the width direction. In the example of the diagram, the belt conveyor 9, the first conveyor 31, and the second conveyor 32 are disposed on a centerline CL in the vehicle width direction.

In the top view of FIG. 3, a rear portion of the belt conveyor 9 overlaps a front portion of the first conveyor 31. In the top view of FIG. 3, a rear portion of the first conveyor 31 overlaps a front portion of the second conveyor 32. In the top view of FIG. 3, the belt conveyor 9, the first conveyor 31, and the second conveyor 32 are disposed continuously in the forward-rearward direction.

As shown in FIG. 1, the tow car 25 is disposed on a side behind the excavation conveyance vehicle 2. The tow car 25 can tow the second conveyance vehicle group 20. The tow car 25 is coupled to the third vehicle 23 in a swingable manner. The tow car 25 is disposed on a pit mouth (the ground) side in the excavation conveyance vehicle 2. The tow car 25 is self-propelled. The second conveyance vehicle group 20 can travel along rails inside a driftway in response to driving of the tow car 25. The tow car 25 includes a battery capable of supplying power to each of the vehicles of the second conveyance vehicle group 20.

Movement Apparatus

The second conveyance vehicle group 20 includes movement apparatuses 40 that are capable of relatively moving the first conveyor 31 and the second conveyor 32. The movement apparatuses 40 include a first movement mechanism 41 capable of moving the first conveyor 31 in a direction orthogonal to the upward-downward direction of the first vehicle 21 and a second movement mechanism 42 capable of moving the second conveyor 32 in a direction orthogonal to the upward-downward direction of the second vehicle 22. Hereinafter, the first movement mechanism 41 will be described in detail. Since the second movement mechanism 42 has a constitution similar to that of the first movement mechanism 41, a detailed description thereof will be omitted.

Figure 4:
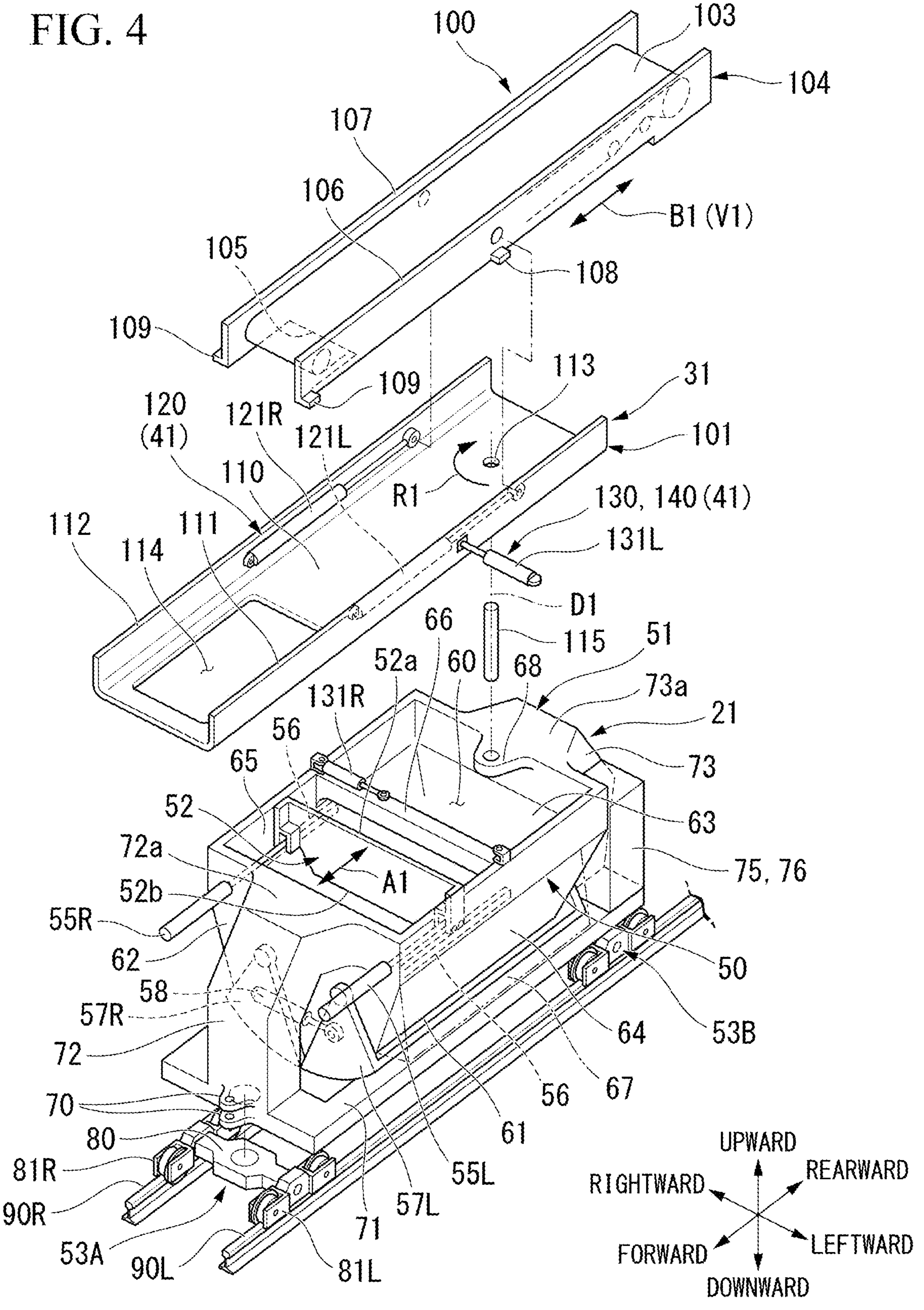
FIG. 4 is an exploded perspective view of a first vehicle, a first conveyor, and a first movement mechanism according to the first embodiment.

FIG. 4 is an exploded perspective view of a first vehicle, a first conveyor, and a first movement mechanism according to the first embodiment.

As shown in FIG. 4, the first movement mechanism 41 is provided in the first vehicle 21.

First Vehicle

The first vehicle 21 includes a carrier 50, a vehicle body frame 51, a blade 52, and bogie mechanisms 53A and 53B.

The carrier 50 has an accommodation space 60 capable of loading excavated matter such as excavation muck. The carrier 50 has a box shape opening upward. The carrier 50 includes a bottom wall 61, a front wall 62, a rear wall 63, a left wall 64, and a right wall 65. The accommodation space 60 is a space surrounded by the bottom wall 61, the front wall 62, the rear wall 63, the left wall 64, and the right wall 65.

The bottom wall 61 is provided in a bottom portion of the carrier 50. The bottom wall 61 extends in the forward-rearward direction and the vehicle width direction.

The front wall 62 stands upward from a front-end portion of the bottom wall 61. The rear wall 63 stands upward from a rear end portion of the bottom wall 61. When viewed in the forward-rearward direction, outer edge sides of the front wall 62 and the rear wall 63 in the vehicle width direction are inclined and extend so as to be positioned on the outward sides in the vehicle width direction as they go upward from the bottom wall 61 side and then extend upward.

The left wall 64 stands upward from a left end portion of the bottom wall 61. The right wall 65 stands upward from a right end portion of the bottom wall 61. When viewed in the forward-rearward direction, the left wall 64 and the right wall 65 extend along the outer edge sides of the front wall 62 and the rear wall 63 in the vehicle width direction. When viewed in the forward-rearward direction, the left wall 64 and the right wall 65 are inclined and extend so as to be positioned on the outward sides in the vehicle width direction as they go upward from the bottom wall 61 side and then extend upward.

Central portions in upper portions of the left wall 64 and the right wall 65 in the forward-rearward direction are coupled by a horizontal member 66 extending in the vehicle width direction. The horizontal member 66 continuously extends in the vehicle width direction between the upper portions of the left wall 64 and the right wall 65 in the vehicle width direction. The horizontal member 66 divides an upper space of the accommodation space 60 in the forward-rearward direction.

For example, material storage spaces 67 may be respectively provided on left and right outward sides of a lower portion of the carrier 50. In the example of the diagram, the storage space 67 on the left outward side is indicated by a two-dot dashed line. In the present embodiment, when viewed in the forward-rearward direction, the left wall 64 and the right wall 65 constituting the left and right-side portions of the lower portion of the carrier 50 are inclined and extend so as to be positioned on the outward sides in the vehicle width direction as they go upward from the bottom wall 61 side. For this reason, the spaces on the left and right outward sides of the lower portion of the carrier 50 can be effectively utilized as the material storage spaces 67.

The vehicle body frame 51 is a skeletal member of the first vehicle 21. The vehicle body frame 51 supports the carrier 50. The first vehicle 21 is connected to a vehicle adjacent thereto in the forward-rearward direction through the vehicle body frame 51. Front side connection brackets 70 for connection to a vehicle adjacent thereto in front of the first vehicle 21 are provided in a front side lower portion of the vehicle body frame 51.

In the present embodiment, the first vehicle 21 is not connected to the seventh vehicle 17 (refer to FIG. 1) through the front side connection brackets 70. A pair of the front side connection brackets 70 are provided with a gap therebetween in the upward-downward direction. The front side connection brackets 70 have through holes opening in the upward-downward direction.

In the present embodiment, the second vehicle 22 is coupled to the first vehicle 21 in a swingable manner through the front side connection brackets 70. The third vehicle 23 is coupled to the second vehicle 22 in a swingable manner through the front side connection brackets 70. The tow car 25 is coupled to the third vehicle 23 in a swingable manner through the front side connection brackets 70.

Although they are not shown in the diagram, rear side connection brackets for connection to a vehicle adjacent thereto behind the first vehicle 21 are provided in a rear side lower portion of the vehicle body frame 51. In the present embodiment, the first vehicle 21 is connected to the second vehicle 22 (refer to FIG. 1) through the rear side connection brackets. Similar to the front side connection brackets 70, a pair of rear side connection brackets may be provided with a gap therebetween in the upward-downward direction. The first vehicle 21 is coupled to the second vehicle 22 in a swingable manner through the rear side connection brackets.

As shown in FIG. 4, the vehicle body frame 51 includes a bottom side frame 71, a front side frame 72, and a rear side frame 73. When viewed in the upward-downward direction, the bottom side frame 71 has a rectangular frame shape extending in the forward-rearward direction. The bottom side frame 71 is longer than the carrier 50 in the forward-rearward direction. The bottom side frame 71 further extends to the outward side in the forward-rearward direction than an outer end portion of the carrier 50 in the forward-rearward direction.

The front side frame 72 couples a front portion of the bottom side frame 71 and a front side upper portion of the carrier 50 to each other. The front side frame 72 extends upward from a central portion in the front portion of the bottom side frame 71 in the vehicle width direction, is then curved, and extends toward the front side upper portion of the carrier 50. The front side frame 72 has a front side upper surface 72*a* having a flat surface shape in a direction orthogonal to the vehicle upward-downward direction. The rear side frame 73 couples a rear portion of the bottom side frame 71 and a rear side upper portion of the carrier 50 to each other. The rear side frame 73 has a rear side upper surface 73*a* having a flat surface shape in a direction orthogonal to the vehicle upward-downward direction.

The front side upper surface 72*a* and the rear side upper surface 73*a* are disposed at the same height positions as each other (positions in the vehicle upward-downward direction). The front side upper surface 72*a* and the rear side upper surface 73*a* face a lower surface of the first conveyor 31. In a top view, the front side upper surface 72*a* and the rear side upper surface 73*a* each have a trapezoidal shape with an upper base on the outward side in the forward-rearward direction.

For example, the front side upper surface 72*a*, the rear side upper surface 73*a*, and the horizontal member 66 may be provided with a friction reducing member for reducing friction (sliding friction) during turning of the first conveyor 31. Accordingly, the first conveyor 31 can turn smoothly.

For example, a power unit 75 including a drive system such as a motor, an inverter, and a hydraulic pump may be provided on the left side of the rear side frame 73 on the rear portion of the bottom side frame 71. For example, a control device 76 controlling constituent elements of the power unit 75 may be provided at a position adjacent to the power unit 75. Accordingly, the power unit 75 and the control device 76 can be disposed effectively utilizing a space on the left side of the rear side frame 73.

The blade 52 is a member for leveling excavated matter inside the accommodation space 60 from above. The blade 52 extends in the upward-downward direction and the vehicle width direction. The blade 52 has a shape capable of moving in the upper space of the accommodation space 60 in the forward-rearward direction. An upper end edge side 52*a* of the blade 52 has a linear shape extending in the vehicle width direction. The upper end edge side 52*a* of the blade 52 is disposed at a position equal to or lower than height positions of the front side upper surface 72*a* and the rear side upper surface 73*a*. The blade 52 is disposed on a side below a turning trajectory of the first conveyor 31. The blade 52 may have a shape capable of passing under the horizontal member 66 and flattening excavated matter to the side behind the horizontal member 66.

When viewed in the forward-rearward direction, a lower portion of the blade 52 has a trapezoidal external shape with an upper base on the lower side. A lower end edge side 52*b* of the blade 52 has a linear shape extending in the vehicle width direction. Accordingly, when the blade 52 moves in the forward-rearward direction, excavated matter loaded inside the accommodation space 60 can be evenly leveled from above.

Blade hydraulic cylinders 55L and 55R capable of moving the blade 52 in the forward-rearward direction are provided in the front wall 62 of the carrier 50. The blade hydraulic cylinders 55L and 55R extend in the forward-rearward direction. The blade hydraulic cylinders 55L and 55R are provided on both the left and right sides of an upper portion of the front wall 62 through the front side frame 72. The blade hydraulic cylinders 55L and 55R are inserted through the through holes opening in the front wall 62 in the forward-rearward direction. Rear end portions (piston rod tip portions) of the blade hydraulic cylinders 55L and 55R are coupled to left and right end portions of the blade 52 through the through holes of the front wall 62. The blade hydraulic cylinders 55L and 55R are driven by means of an operating fluid supplied from the hydraulic pump.

Guide members 56 for guiding the blade 52 in the forward-rearward direction are respectively provided in the left wall 64 and the right wall 65 of the carrier 50. The guide members 56 are disposed on inward sides of the upper portions of the left wall 64 and the right wall 65. The guide members 56 extend in the forward-rearward direction. End portions of the blade 52 in the vehicle width direction are respectively disposed on the guide members 56. The blade 52 moves in a direction of an arrow A1 along the guide members 56 in response to driving of the blade hydraulic cylinders 55L and 55R.

A discharge hole (not shown) for discharging excavated matter inside the accommodation space 60 is provided in the carrier 50. The discharge hole opens in the bottom wall 61 of the carrier 50 in the upward-downward direction. For example, one large discharge hole opens in the bottom wall 61.

Gate members 57L and 57R capable of moving such that the discharge hole can be opened and closed are provided in the carrier 50. A pair of left and right gate members 57L and 57R are provided. In the example of the diagram, a state in which the discharge hole is closed by the left and right gate members 57L and 57R is shown. In a front view, the gate members 57L and 57R each have a fan shape with an arc on the lower side. The gate members 57L and 57R extend rearward from the lower portion of the fan shape such that the discharge hole is closed. The gate members 57L and 57R can turn about an axis in the forward-rearward direction.

A gate hydraulic cylinder 58 capable of moving the gate members 57L and 57R is provided on the front side of the carrier 50. The gate hydraulic cylinder 58 extends in the vehicle width direction. The left end portion (piston rod tip portion) of the gate hydraulic cylinder 58 is coupled to the gate member 57L on the left side. The gate hydraulic cylinder 58 is driven by means of an operating fluid supplied from the hydraulic pump.

The gate member 57R on the right side comes into contact with the gate member 57L on the left side. The gate member 57R on the right side is interlocked with the gate member 57L on the left side. The left and right gate members 57L and 57R turn so as to be able to open and close the discharge hole about each axis in response to driving of the gate hydraulic cylinder 58.

A pivot member 68 turnably supporting the first conveyor 31 is provided on the rear side of the carrier 50. The pivot member 68 protrudes to the front side from a central portion in an upper portion of the rear wall 63 of the carrier 50 in the vehicle width direction. The pivot member 68 has a pivot hole on a first axis D1 in the upward-downward direction of the first vehicle 21. The pivot hole has a circular shape when viewed in the upward-downward direction. In the top view of FIG. 3, the first axis D1 is disposed on the lateral centerline CL of the vehicle.

As shown in FIG. 4, the wheels of the first vehicle 21 are supported by the bogie mechanisms 53A and 53B. The bogie mechanisms 53A and 53B can turn the wheels of the first vehicle 21 in a direction orthogonal to the upward-downward direction of the first vehicle 21. A pair of bogie mechanisms 53A and 53B are provided with a gap therebetween in the forward-rearward direction. The pair of front and rear bogie mechanisms 53A and 53B include the bogie mechanism 53A for front wheels and the bogie mechanism 53B for rear wheels. The bogie mechanism 53A for front wheels can turn the front wheels of the first vehicle 21 in a direction orthogonal to the upward-downward direction of the first vehicle 21. The bogie mechanism 53B for rear wheels can turn the rear wheels of the first vehicle 21 in a direction orthogonal to the upward-downward direction of the first vehicle 21. Hereinafter, the bogie mechanism 53A for front wheels will be described in detail. Since the bogie mechanism 53B for rear wheels has a constitution similar to that of the bogie mechanism 53A for front wheels, a detailed description thereof will be omitted.

The bogie mechanism 53A for front wheels includes a swing frame 80 and pitching frames 81L and 81R.

The swing frame 80 is coupled to the vehicle body frame 51 in a swingable manner. The swing frame 80 extends in a manner of straddling between left and right rails 90L and 90R. A central portion between the left and right rails 90L and 90R in the swing frame 80 is coupled to the vehicle body frame 51 such that it can turn about an axis in the upward-downward direction.

Figure 5:
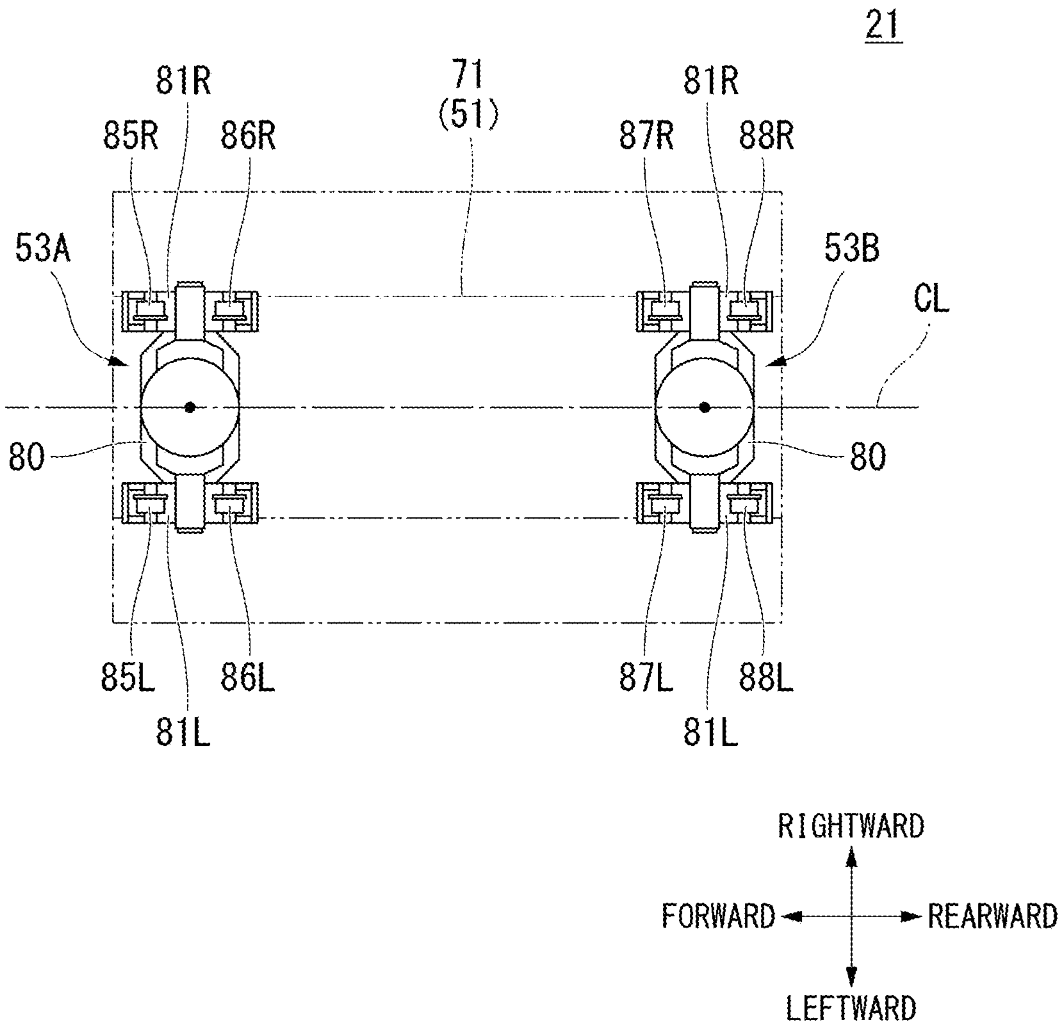
FIG. 5 is an explanatory view of disposition of bogie mechanisms according to the first embodiment.

FIG. 5 is an explanatory view of disposition of bogie mechanisms according to the first embodiment. FIG. 5 corresponds to a top view of the first vehicle 21 viewed from above. In FIG. 5, the external shape of the first vehicle 21 and the bottom side frame 71 of the vehicle body frame 51 are indicated by two-dot dashed lines.

In the top view of FIG. 5, a turning center of the swing frame 80 is disposed on the centerline CL of the vehicle body frame 51 in the vehicle width direction.

The pitching frames 81L and 81R are respectively coupled to the left and right end portions of the swing frame 80. The pitching frames 81L and 81R are respectively provided on the left and right rails 90L and 90R. The pitching frames 81L and 81R turnably support the wheels of the first vehicle 21.

The swing frame 80 of the bogie mechanism 53A for front wheels are coupled to the front portion of the bottom side frame 71 of the vehicle body frame 51. Meanwhile, the swing frame 80 of the bogie mechanism 53B for rear wheels are coupled to the rear portion of the bottom side frame 71.

The pitching frames 81L and 81R of the bogie mechanism 53A for front wheels turnably support the front wheels of the first vehicle 21. In the example of the diagram, four front wheels in total including a pair of left and right front side front wheels 85L and 85R and a pair of left and right rear side front wheels 86L and 86R are provided. The front wheels 85L, 85R, 86L, and 86R of the first vehicle 21 can independently turn together with the bogie mechanism 53A for front wheels in a direction orthogonal to the upward-downward direction of the first vehicle 21 with respect to a front portion of the vehicle body frame 51.

Meanwhile, the pitching frames 81L and 81R of the bogie mechanism 53B for rear wheels turnably support the rear wheels of the first vehicle 21. In the example of the diagram, four rear wheels in total including a pair of left and right front side rear wheels 87L and 87R and a pair of left and right rear side rear wheels 88L and 88R are provided. The rear wheels 87L, 87R, 88L, and 88R of the first vehicle 21 can independently turn together with the bogie mechanism 53B for rear wheels in a direction orthogonal to the upward-downward direction of the first vehicle 21 with respect to a rear portion of the vehicle body frame 51.

First Conveyor

As shown in FIG. 2, the first conveyor 31 is supported by the upper portion of the first vehicle 21. The first conveyor 31 can convey excavated matter in the first conveyance direction V1 orthogonal to the upward-downward direction of the first vehicle 21. As shown in FIG. 4, the first conveyor 31 includes a conveyor unit 100 and a support frame 101.

The conveyor unit 100 includes a conveyor main body 103 and a conveyor frame 104.

The conveyor main body 103 has the first conveyance direction V1 as a longitudinal direction. The conveyor main body 103 is a belt conveyor. In the example of the diagram, the longitudinal direction of the conveyor main body 103 is parallel to the forward-rearward direction of the first vehicle 21. In the example of the diagram, a transverse direction of the conveyor main body 103 is parallel to the width direction of the first vehicle 21.

The conveyor frame 104 supports the conveyor main body 103. Similar to the conveyor main body 103, the conveyor frame 104 has the first conveyance direction V1 as a longitudinal direction. The conveyor frame 104 is supported in a slidable manner in the longitudinal direction with respect to the support frame 101. The conveyor frame 104 is longer than the conveyor main body 103 in the longitudinal direction. The conveyor frame 104 includes a conveyor bottom plate 105, a first conveyor first side plate 106, and a first conveyor second side plate 107.

The conveyor bottom plate 105 has a rectangular plate shape having the first conveyance direction V1 as a longitudinal direction.

The first conveyor first side plate 106 and the first conveyor second side plate 107 stand upward from an end portion of the conveyor bottom plate 105 in the transverse direction. Standing height positions of the first conveyor first side plate 106 and the first conveyor second side plate 107 (positions in the vehicle upward-downward direction) are the same as each other. The first conveyor first side plate 106 and the first conveyor second side plate 107 are disposed with a gap therebetween in the transverse direction of the conveyor main body 103. The first conveyor first side plate 106 and the first conveyor second side plate 107 extend parallel to each other in the longitudinal direction. The first conveyor first side plate 106 and the first conveyor second side plate 107 have the same lengths as each other in the longitudinal direction.

A pair of projection portions 108 and 109 protruding to the outward sides in the transverse direction of the conveyor main body 103 are provided in the first conveyor first side plate 106 and the first conveyor second side plate 107. The pair of projection portions 108 and 109 include the center side projection portions 108 and the end portion side projection portions 109.

The center side projection portions 108 are provided in central portions of lower end edges of the first conveyor first side plate 106 and the first conveyor second side plate 107 in the longitudinal direction. In the example of the diagram, the center side projection portion 108 on the first conveyor first side plate 106 side is shown.

The end portion side projection portions 109 are provided in end portions of the lower end edges of the first conveyor first side plate 106 and the first conveyor second side plate 107 in the longitudinal direction. In the example of the diagram, the end portion side projection portions 109 are disposed in front-end portions of the first conveyor first side plate 106 and the first conveyor second side plate 107. Protruding height positions of the center side projection portions 108 and the end portion side projection portions 109 (position of the conveyor main body 103 in the transverse direction) are the same as each other.

The support frame 101 supports the conveyor unit 100. The support frame 101 is coupled to the first vehicle 21 in a swingable manner. The support frame 101 has the first conveyance direction V1 as a longitudinal direction. In the example of the diagram, regarding the longitudinal direction of the support frame 101, similar to the conveyor main body 103, the support frame 101 has the first conveyance direction V1 as a longitudinal direction. The transverse direction of the support frame 101 is parallel to the transverse direction of the conveyor main body 103.

The support frame 101 has a U-shape when viewed in the longitudinal direction. The support frame 101 includes a support bottom plate 110, a first support side plate 111, and a second support side plate 112.

The support bottom plate 110 has a plate shape having the first conveyance direction V1 as a longitudinal direction. The support bottom plate 110 has a shaft hole 113 on the first axis D1 in the upward-downward direction of the first vehicle 21. The shaft hole 113 has a circular shape when viewed in the upward-downward direction. The shaft hole 113 is disposed on one end side of the support bottom plate 110 in the longitudinal direction. In the example of the diagram, the shaft hole 113 is disposed on a rear end side of the support bottom plate 110. When viewed in the upward-downward direction, the shaft hole 113 overlaps the pivot hole of the pivot member 68. For example, the support bottom plate 110 is coupled to the pivot member 68 through a shaft member 115 such as a pin. The support frame 101 can turn about the first axis D1.

The first support side plate 111 and the second support side plate 112 stand upward from an end portion of the support bottom plate 110 in the transverse direction. Standing height positions of the first support side plate 111 and the second support side plate 112 (positions in the vehicle upward-downward direction) are the same as each other. The first support side plate 111 and the second support side plate 112 extend parallel to each other in the longitudinal direction of the support bottom plate 110. The first support side plate 111 and the second support side plate 112 have the same lengths as each other in the longitudinal direction of the support bottom plate 110. The first support side plate 111 and the second support side plate 112 are disposed on the outward sides of the first conveyor first side plate 106 and the first conveyor second side plate 107 in the transverse direction of the support bottom plate 110.

In the transverse direction of the support bottom plate 110, a gap between the first support side plate 111 and the second support side plate 112 is at a position equal to or higher than the protruding height positions of the projection portions 108 and 109 in the first conveyor first side plate 106 and the first conveyor second side plate 107.

For example, the pair of projection portions 108 and 109 may be provided with a friction reducing member for reducing friction (sliding friction) during movement of the conveyor unit 100. Accordingly, the conveyor unit 100 can be smoothly moved with respect to the support frame 101.

The support bottom plate 110 has an opening portion 114 having a size through which excavated matter can pass. The opening portion 114 has a rectangular shape when viewed in the upward-downward direction. The opening portion 114 is disposed on the other end side of the support bottom plate 110 in the longitudinal direction. In the example of the diagram, the opening portion 114 is disposed on a front-end side of the support bottom plate 110. The opening portion 114 is disposed on a side opposite to the shaft hole 113 in the longitudinal direction of the support bottom plate 110. The opening portion 114 is opened and closed in response to movement of the conveyor unit 100 in the longitudinal direction with respect to the support frame 101. The opening portion 114 opens in the upward-downward direction when excavated matter passes therethrough and communicates with the accommodation space 60.

First Movement Mechanism

The first movement mechanism 41 can move the first conveyor 31 in a direction orthogonal to the upward-downward direction of the first vehicle 21. The first movement mechanism 41 includes a first longitudinal movement mechanism 120 capable of moving the first conveyor 31 in the longitudinal direction of the first conveyor 31. The first longitudinal movement mechanism 120 is provided in the support frame 101.

The first longitudinal movement mechanism 120 includes longitudinal movement hydraulic cylinders 121L and 121R extending in the longitudinal direction of the support bottom plate 110. A pair of longitudinal movement hydraulic cylinders 121L and 121R are provided with a gap therebetween in the transverse direction of the support bottom plate 110. First end portions (piston rod tip portions) of the longitudinal movement hydraulic cylinders 121L and 121R in the longitudinal direction are coupled to the central portions of the first conveyor first side plate 106 and the first conveyor second side plate 107 in the longitudinal direction. Second end portions (end portions on a side opposite to the piston rod tip portions) of the longitudinal movement hydraulic cylinders 121L and 121R in the longitudinal direction are coupled to parts in the vicinity of the central portions of the first support side plate 111 and the second support side plate 112 in the longitudinal direction. The longitudinal movement hydraulic cylinders 121L and 121R are driven by means of an operating fluid supplied from the hydraulic pump. The conveyor unit 100 moves in a direction of an arrow B1 along the support frame 101 in response to driving of the longitudinal movement hydraulic cylinders 121L and 121R.

The first movement mechanism 41 includes a first lateral movement mechanism 130 capable of moving the first conveyor 31 in the width direction of the first vehicle 21. The first lateral movement mechanism 130 is disposed between the first vehicle 21 and the first conveyor 31.

The first lateral movement mechanism 130 includes first hydraulic cylinders 131L and 131R coupling the first vehicle 21 and the first conveyor 31 such that the first conveyor 31 is movable in a direction orthogonal to the upward-downward direction of the first vehicle 21. A pair of first hydraulic cylinders 131L and 131R are provided with a gap therebetween in the width direction of the first vehicle 21. The pair of first hydraulic cylinders 131L and 131R couple the upper portions of the left wall 64 and the right wall 65 of the carrier 50 and the support frame 101 to each other.

In the example of the diagram, the pair of first hydraulic cylinders 131L and 131R extend in the width direction of the first vehicle 21. A first end portion (piston rod tip portion) of the first hydraulic cylinder 131L on the left side in the longitudinal direction is coupled to a part in the vicinity of a central portion of the first support side plate 111 in the longitudinal direction. A coupling position of the first hydraulic cylinder 131L on the left side with respect to the first support side plate 111 is disposed between the shaft hole 113 and the opening portion 114 in the longitudinal direction of the support frame 101. The first end portion of the first hydraulic cylinder 131L on the left side in the longitudinal direction can turn about an axis in the upward-downward direction in a coupling part of the first support side plate 111.

A second end portion (an end portion on a side opposite to the piston rod tip portion) of the first hydraulic cylinder 131L on the left side in the longitudinal direction is coupled to an upper end portion of the left wall 64 of the carrier 50. When viewed in the upward-downward direction, the coupling position of the first hydraulic cylinder 131L on the left side with respect to the left wall 64 of the carrier 50 is disposed in the vicinity of a left end portion of the horizontal member 66. The second end portion of the first hydraulic cylinder 131L on the left side in the longitudinal direction can turn about an axis in the upward-downward direction in a coupling part of the left wall 64.

A first end portion (piston rod tip portion) of the first hydraulic cylinder 131R on the right side in the longitudinal direction is coupled to a part in the vicinity of a central portion of the second support side plate 112 in the longitudinal direction. A coupling position of the first hydraulic cylinder 131R on the right side with respect to the second support side plate 112 is disposed between the shaft hole 113 and the opening portion 114 in the longitudinal direction of the support frame 101. The first end portion of the first hydraulic cylinder 131R on the right side in the longitudinal direction can turn about an axis in the upward-downward direction in a coupling part of the second support side plate 112.

A second end portion (an end portion on a side opposite to the piston rod tip portion) of the first hydraulic cylinder 131R on the right side in the longitudinal direction is coupled to an upper end portion of the right wall 65 of the carrier 50. When viewed in the upward-downward direction, the coupling position of the first hydraulic cylinder 131R on the right side with respect to the right wall 65 of the carrier 50 is disposed in the vicinity of a right end portion of the horizontal member 66. The second end portion of the first hydraulic cylinder 131R on the right side in the longitudinal direction can turn about an axis in the upward-downward direction in a coupling part of the right wall 65.

The first hydraulic cylinders 131L and 131R are driven by means of an operating fluid supplied from the hydraulic pump. The first conveyor 31 turns about the first axis D1 in response to driving of the first hydraulic cylinders 131L and 131R.

For example, the first hydraulic cylinder 131L on the left side extends longer than a predetermined length, and if the first hydraulic cylinder 131R on the right side contracts shorter than the predetermined length, the first conveyor 31 turns about the first axis D1 in a direction of an arrow R1. Meanwhile, the first hydraulic cylinder 131L on the left side contracts shorter than the predetermined length, and if the first hydraulic cylinder 131R on the right side extends longer than the predetermined length, the first conveyor 31 turns about the first axis D1 in a direction opposite to the direction of the arrow R1.

In this manner, the first lateral movement mechanism 130 can turn the first conveyor 31 about the first axis D1. The first lateral movement mechanism 130 corresponds to a first turning mechanism 140 capable of turning the first conveyor 31 about the first axis D1 in the upward-downward direction of the first vehicle 21. The first lateral movement mechanism 130 functions as the first turning mechanism 140 when the left and right first hydraulic cylinders 131L and 131R are associated with the shaft member 115 passing through the pivot hole of the pivot member 68 and the shaft hole 113.

Second Movement Mechanism

As shown in FIG. 1, the second movement mechanism 42 is provided in the second vehicle 22. Similar to the first vehicle 21 shown in FIG. 4, the second vehicle 22 includes the carrier 50, the frame 51, the blade 52, and the bogie mechanisms 53A and 53B.

In the second vehicle 22, a second pivot member (not shown) turnably supporting the second conveyor 32 is provided on the front side of the carrier 50. The second pivot member is disposed on a side opposite to the pivot member 68 of the first vehicle 21 in the forward-rearward direction. The second pivot member protrudes to the rear side from a central portion in the upper portion of the front wall 62 of the carrier 50 in the vehicle width direction. The second pivot member has a pivot hole on a second axis D2 in the upward-downward direction of the second vehicle 22. In the top view of FIG. 3, the second axis D2 is disposed on the lateral centerline CL of the vehicle.

The second movement mechanism 42 includes a second longitudinal movement mechanism (not shown) capable of moving the second conveyor 32 in the longitudinal direction of the second conveyor 32. The second longitudinal movement mechanism is provided in the support frame 101 of the second conveyor 32. Since the second longitudinal movement mechanism has a constitution similar to that of the first longitudinal movement mechanism 120 shown in FIG. 4, a detailed description will be omitted.

The second movement mechanism 42 includes a second lateral movement mechanism (not shown) capable of moving the second conveyor 32 in the width direction of the second vehicle 22. The second lateral movement mechanism is disposed between the second vehicle 22 and the second conveyor 32. Since the second lateral movement mechanism has a constitution similar to that of the first lateral movement mechanism 130 shown in FIG. 4, a detailed description will be omitted.

The second lateral movement mechanism includes a second hydraulic cylinder (not shown) coupling the second vehicle 22 and the second conveyor 32 such that the second conveyor 32 is movable in a direction orthogonal to the upward-downward direction of the second vehicle 22. Since the second hydraulic cylinder has a constitution similar to that of the first hydraulic cylinders 131L and 131R shown in FIG. 4, a detailed description will be omitted.

The second hydraulic cylinder is driven by means of an operating fluid supplied from the hydraulic pump. The second conveyor 32 turns about the second axis D2 in response to driving of the second hydraulic cylinder. The second lateral movement mechanism can turn the second conveyor 32 about the second axis D2. The second lateral movement mechanism corresponds to a second turning mechanism capable of turning the second conveyor 32 about the second axis D2 in the upward-downward direction of the second vehicle 22. Since the second turning mechanism has a constitution similar to that of the first turning mechanism 140 shown in FIG. 4, a detailed description will be omitted.

Road Decking Panel

Figure 6:
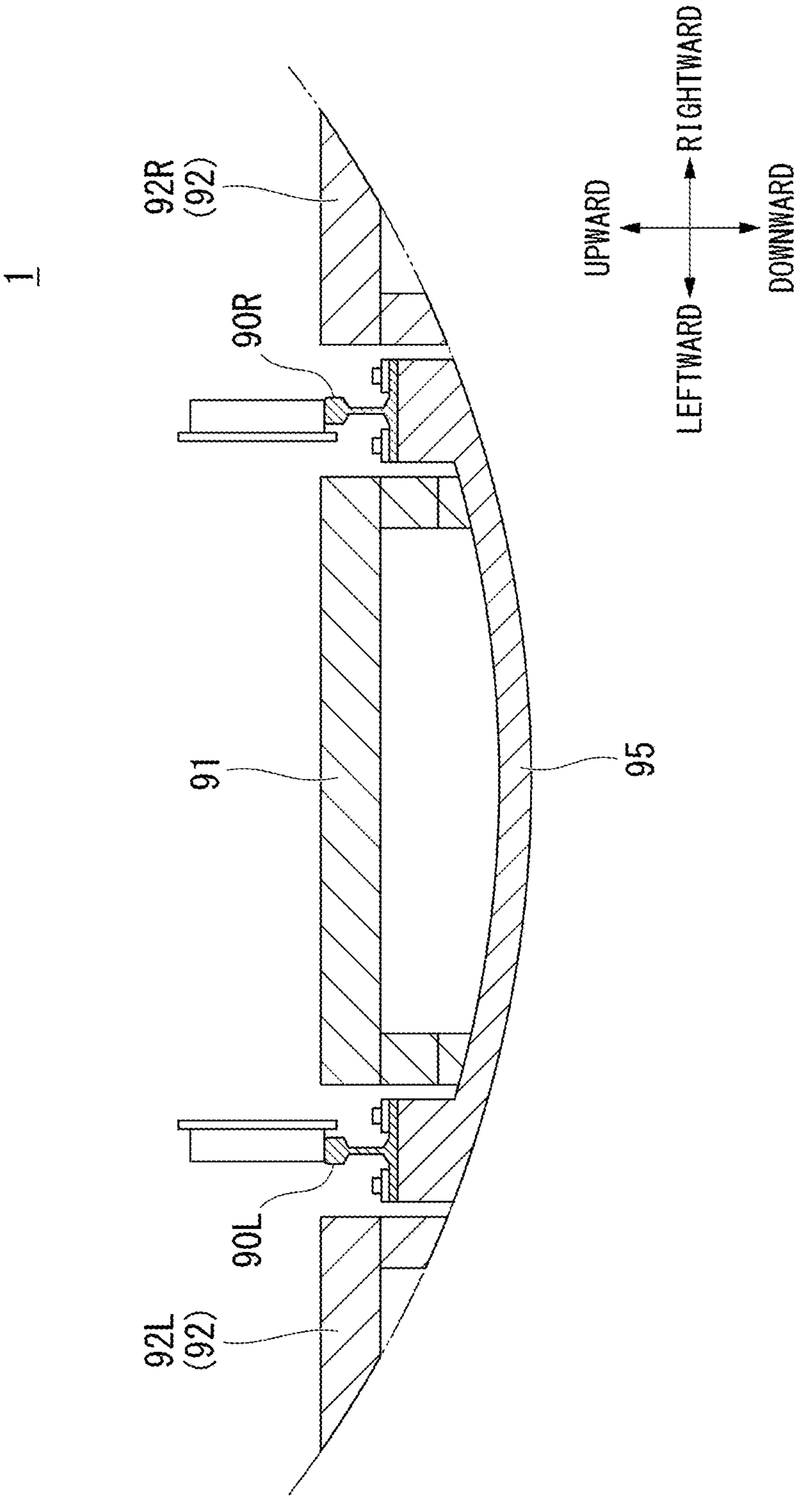
FIG. 6 is an explanatory view of disposition of a plurality of road decking panels according to the first embodiment.

FIG. 6 is an explanatory view of disposition of a plurality of road decking panels according to the first embodiment. FIG. 6 is a view corresponding to a cross section of a tunnel.

As shown in FIG. 6, the excavated matter conveyance system 1 includes the rails 90L and 90R and a plurality of road decking panels 91 and 92.

The rails 90L and 90R support the wheels of the excavation conveyance vehicle 2 (including the wheels of the first vehicle 21 and the second vehicle 22) shown in FIG. 1. The rails 90L and 90R are supported by crossties 95. In the cross-sectional view of FIG. 6, the crossties 95 each have a U-shape. A plurality of crossties 95 are disposed with a gap therebetween in a depth direction of the paper in FIG. 6.

As shown in FIG. 1, the plurality of road decking panels 91 and 92 are divided with the rails 90L and 90R as boundaries. The plurality of road decking panels 91 and 92 are disposed at heights equal to or higher than upper ends of the rails 90L and 90R in the vertical direction. Each of upper surfaces of the plurality of road decking panels 91 and 92 is disposed on substantially the same flat surface.

The plurality of road decking panels 91 and 92 include center blocks 91 and side blocks 92L and 92R. Each of the center blocks 91 is disposed between a pair of rails 90L and 90R. The center blocks 91 are provided in a manner of straddling between the left and right inward sides of the crossties 95. The side blocks 92L and 92R are disposed on the outward sides of the pair of rails 90L and 90R. Pairs of left and right side blocks 92L and 92R are disposed with the center blocks 91 therebetween.

An upper end on the center block 91 side in the side block 92L on the left side is disposed at substantially the same position as an upper end of the center block 91 on the left side in the vertical direction. An upper end on the center block 91 side in the side block 92R on the right side is disposed at substantially the same position as an upper end of the center block 91 on the right side in the vertical direction.

Operations of Movement Apparatus

Figure 7:
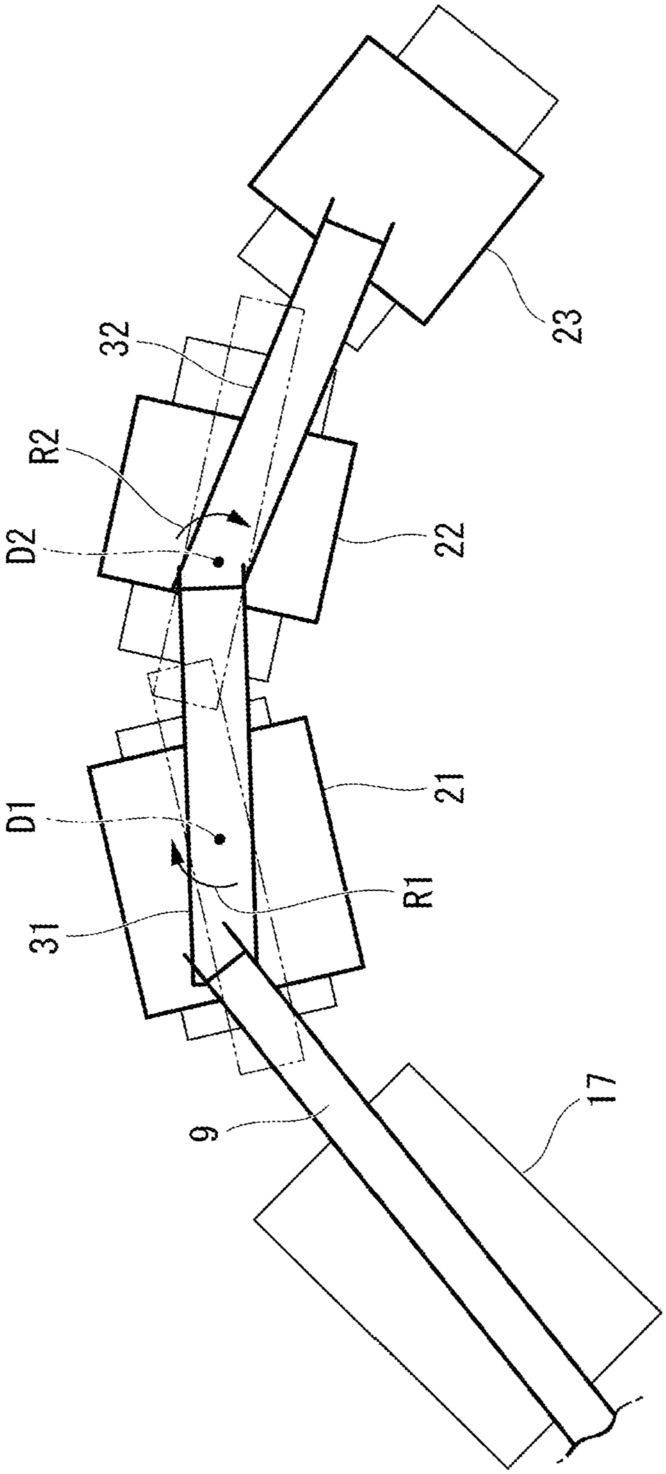
FIG. 7 is an explanatory view of operations of a movement apparatus according to the first embodiment.

FIG. 7 is an explanatory view of operations of a movement apparatus according to the first embodiment.

As shown in FIG. 7, the first conveyor 31 can turn about the first axis D1 on the rear side of the first vehicle 21. The second conveyor 32 can turn about the second axis D2 on the front side of the second vehicle 22. In the example of the diagram, the first conveyor 31 and the second conveyor 32 before turning are indicated by two-dot dashed lines, and the first conveyor 31 and the second conveyor 32 after turning are indicated by solid lines. For example, turning angles of the first conveyor 31 and the second conveyor 32 may be limited so as not to interfere with a wall surface of a tunnel during turning thereof.

When the first vehicle 21 and the second vehicle 22 travel in a curved tunnel, the first conveyor 31 and the second conveyor 32 move in a direction orthogonal to the vehicle upward-downward direction due to operations of the movement apparatuses 40. For example, when the first vehicle 21 and the second vehicle 22 pass a curved part that is curved to the left with respect to a forward movement direction, the first conveyor 31 turns in the direction of the arrow R1 shown in FIG. 7, and the second conveyor 32 turns in a direction of an arrow R2 shown in FIG. 7. Meanwhile, when the first vehicle 21 and the second vehicle 22 pass a curved part that is curved to the right with respect to the forward movement direction, the first conveyor 31 turns in a direction opposite to the direction of the arrow R1 shown in FIG. 7, and the second conveyor 32 turns in a direction opposite to the direction of the arrow R2 shown in FIG. 7.

In the present embodiment, the first conveyor 31 and the second conveyor 32 can each move in the longitudinal direction and can each move in the vehicle width direction due to operations of the movement apparatuses 40. For this reason, even when the first vehicle 21 and the second vehicle 22 travel in a curved tunnel, an end portion of the first conveyor 31 on the seventh vehicle 17 side can overlap an end portion of the belt conveyor 9 on the first vehicle 21 side in a top view, and an end portion of the first conveyor 31 on the second vehicle 22 side can overlap an end portion of the second conveyor 32 on the first vehicle 21 side in a top view.

Example of Method for Loading Excavated Matter

Figure 8:
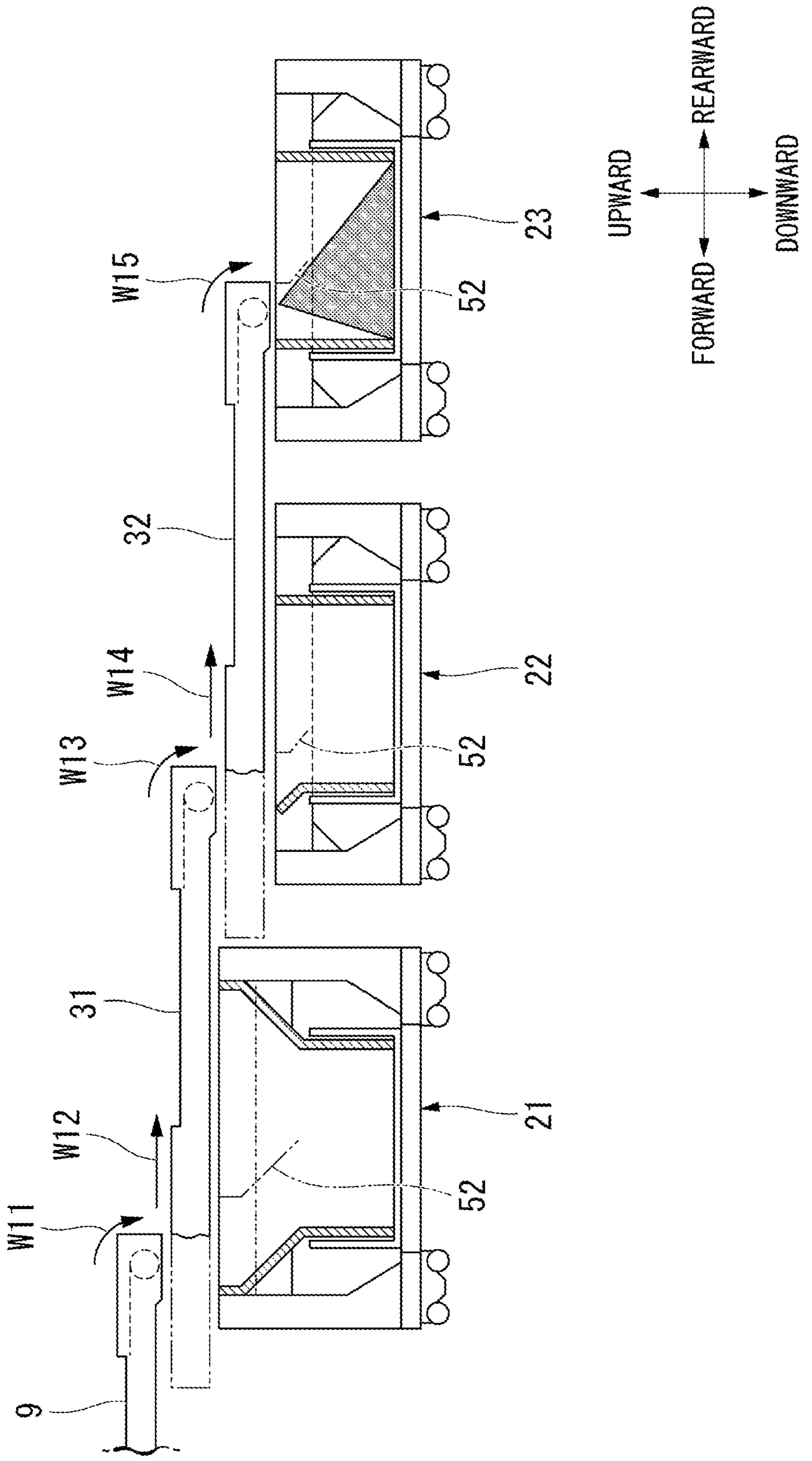
FIG. 8 is a view showing an example of a method for loading excavated matter according to the first embodiment.
Figure 9:
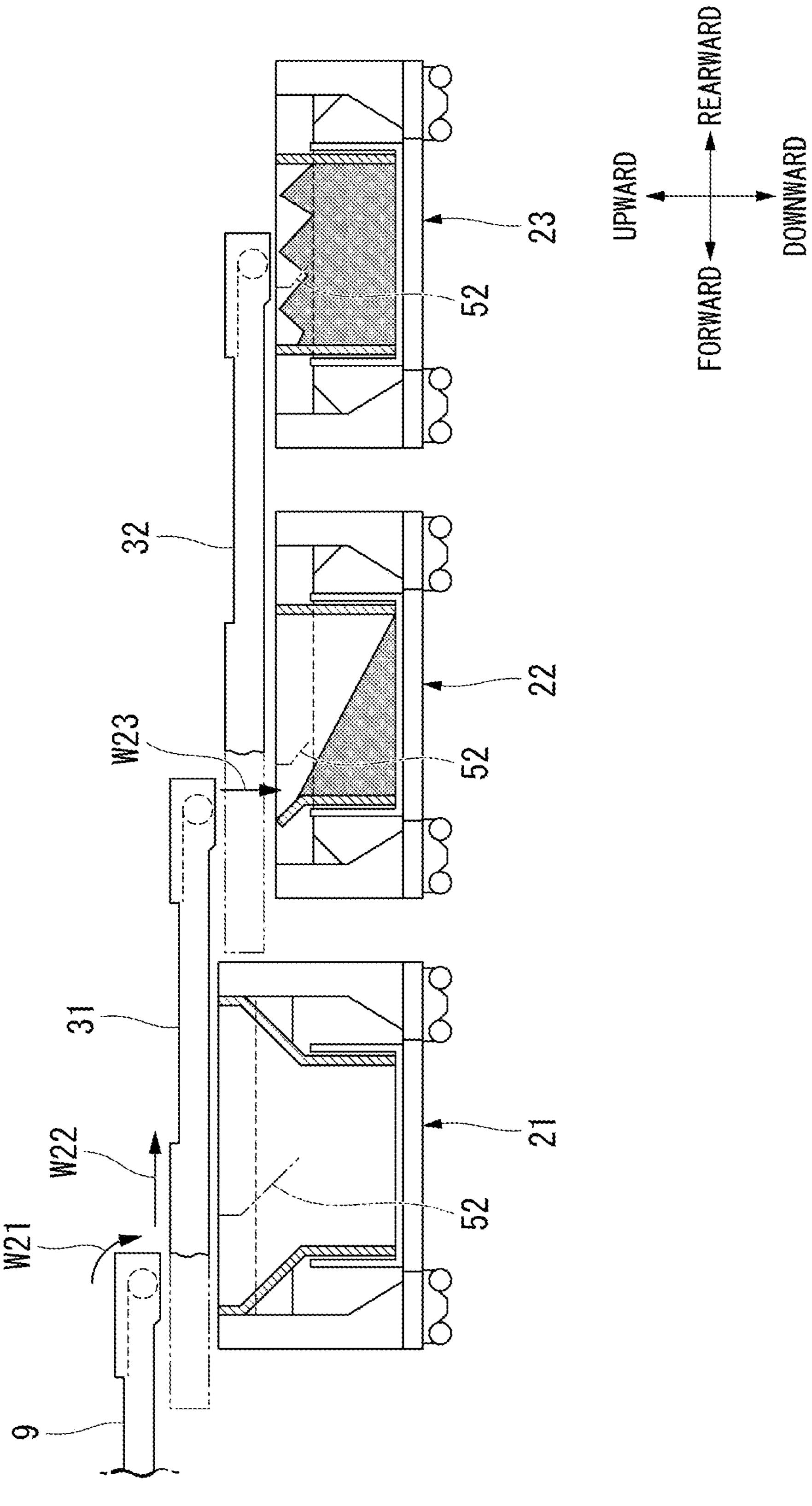
FIG. 9 is a view, subsequent to FIG. 8, showing the example of a method for loading excavated matter.
Figure 10:
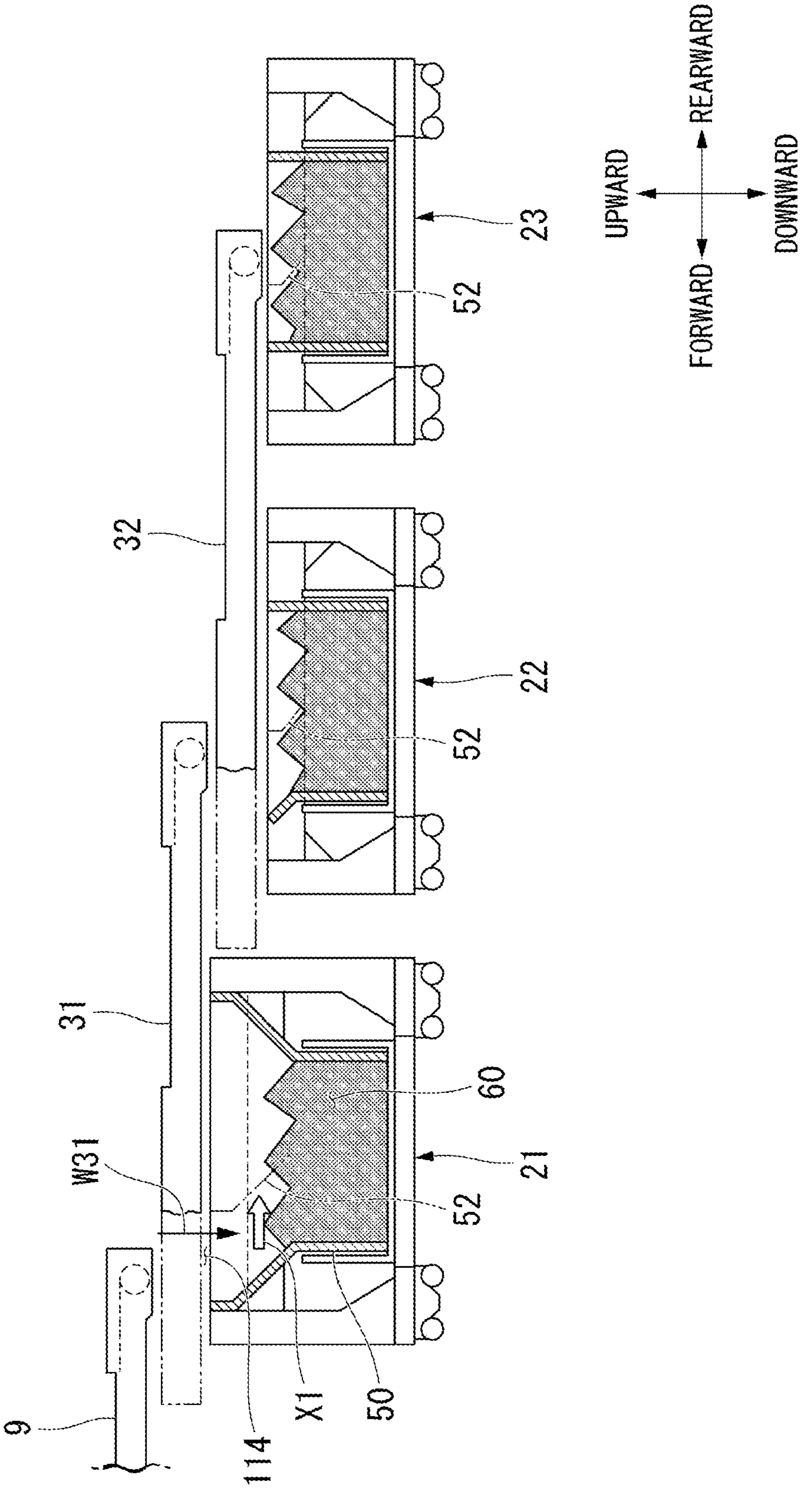
FIG. 10 is a view, subsequent to FIG. 9, showing the example of a method for loading excavated matter.

FIG. 8 is a view showing an example of a method for loading excavated matter according to the first embodiment. FIG. 9 is a view, subsequent to FIG. 8, showing the example of a method for loading excavated matter. FIG. 10 is a view, subsequent to FIG. 9, showing the example of a method for loading excavated matter. Using FIGS. 8 to 10, an example of a method for loading excavated matter will be described.

For example, as shown in FIG. 8, excavated matter is conveyed toward the third vehicle 23 from the belt conveyor 9 through the first conveyor 31 and the second conveyor 32 (directions of arrows W11, W12, W13, W14, and W15 in the diagram). Next, excavated matter is loaded into the accommodation space of the carrier of the third vehicle 23. When excavated matter has risen locally inside the accommodation space, the excavated matter inside the accommodation space is leveled from above by moving the blade 52. In this manner, excavated matter conveyed from the belt conveyor 9 is loaded on the third vehicle 23.

As shown in FIG. 9, after a predetermined amount of excavated matter is loaded on the third vehicle 23, the excavated matter is conveyed to the second conveyor 32 from the belt conveyor 9 through the first conveyor 31, and the excavated matter is loaded into the accommodation space of the carrier of the second vehicle 22 through an opening portion of the second conveyor 32 on the front side (directions of arrows W21, W22, and W23 in the diagram). When excavated matter has risen locally inside the accommodation space, the excavated matter inside the accommodation space is leveled from above by moving the blade 52. In this manner, excavated matter conveyed from the belt conveyor 9 is loaded on the second vehicle 22.

As shown in FIG. 10, after a predetermined amount of excavated matter is loaded on the second vehicle 22, the excavated matter is conveyed to the first conveyor 31 from the belt conveyor 9, and the excavated matter is loaded into the accommodation space 60 of the carrier 50 of the first vehicle 21 through the opening portion 114 of the first conveyor 31 on the front side (a direction of an arrow W31 in the diagram). When excavated matter has risen locally inside the accommodation space 60, the excavated matter inside the accommodation space 60 is leveled from above by moving the blade 52 in a direction of an arrow X1. In this manner, excavated matter conveyed from the belt conveyor 9 is loaded on the first vehicle 21.

As above, excavated matter can be loaded on the first vehicle 21, the second vehicle 22, and the third vehicle 23.

In this manner, since excavated matter conveyed from the belt conveyor 9 is loaded from the vehicles on the rear side, the loading capacity can be adjusted in the vehicle having a large capacity on the front side. From the viewpoint of system redundancy as well, since excavated matter is loaded first on the pit mouth side, even if there is a problem with excavation or the belt conveyor, excavated matter in parts in which loading has already been completed can be transported.

Another Example of Method for Loading Excavated Matter

Figure 11:
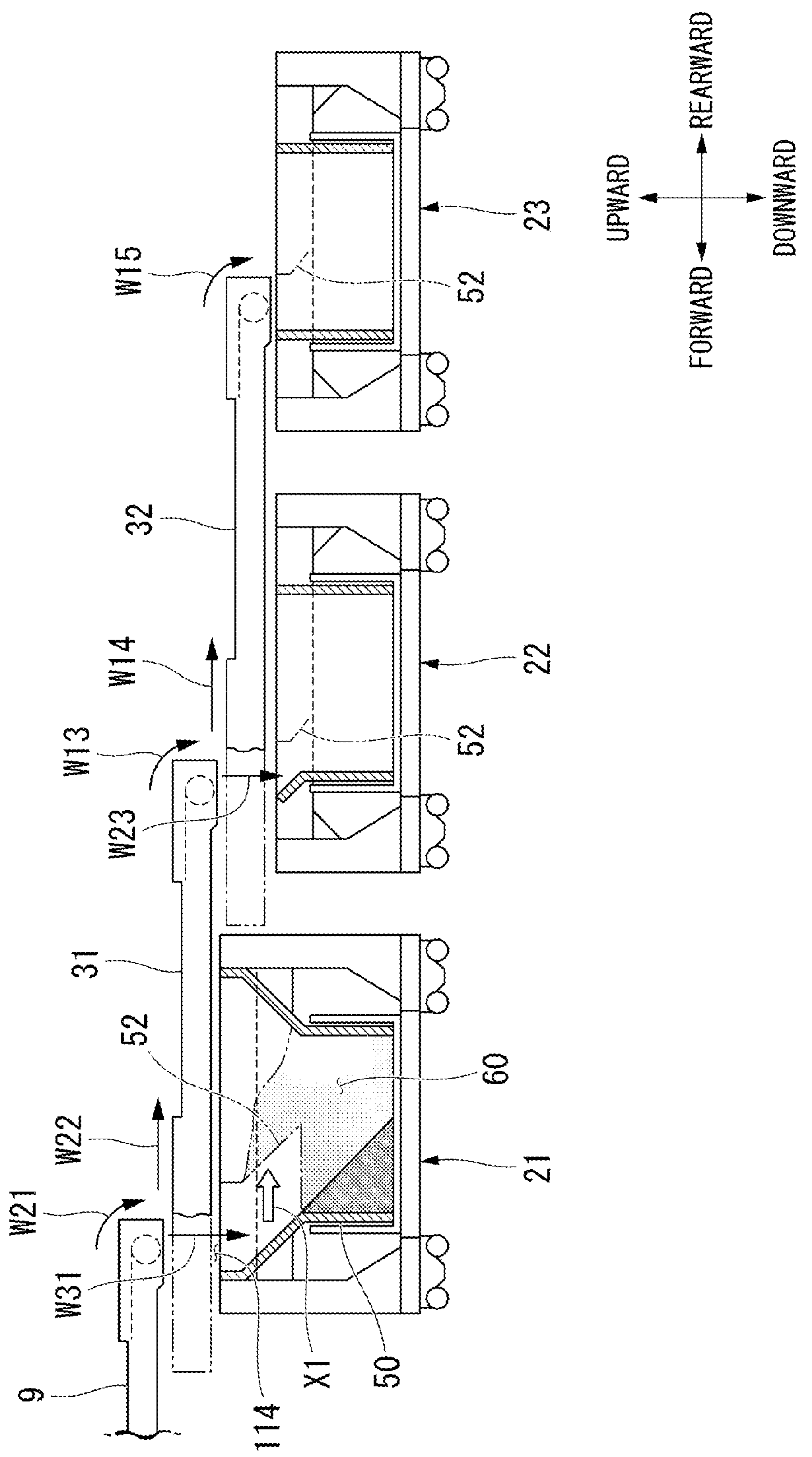
FIG. 11 is a view showing another example of a method for loading excavated matter according to the first embodiment.

FIG. 11 is a view showing another example of a method for loading excavated matter according to the first embodiment. Using FIG. 11, another example of a method for loading excavated matter will be described.

For example, excavated matter is conveyed to the first conveyor 31 from the belt conveyor 9, and the excavated matter is loaded into the accommodation space 60 of the carrier 50 of the first vehicle 21 through the opening portion 114 of the first conveyor 31 on the front side (direction of the arrow W31 in the diagram). If excavated matter is loaded through the opening portion 114 on the front side, the excavated matter may rise locally in a front space inside the accommodation space 60. In this case, the blade 52 is moved in the forward-rearward direction (direction of the arrow X1 in the diagram). Accordingly, excavated matter inside the accommodation space 60 is leveled from above. In this manner, excavated matter conveyed from the belt conveyor 9 is loaded on the first vehicle 21.

After a predetermined amount of excavated matter is loaded on the first vehicle 21, the excavated matter is conveyed to the second conveyor 32 from the belt conveyor 9 through the first conveyor 31, and the excavated matter is loaded into the accommodation space of the carrier of the second vehicle 22 through the opening portion of the second conveyor 32 on the front side (directions of the arrows W21, W22, and W23 in the diagram). When excavated matter has risen locally inside the accommodation space, the excavated matter inside the accommodation space is leveled from above by moving the blade 52. In this manner, excavated matter conveyed from the belt conveyor 9 is loaded on the second vehicle 22.

After a predetermined amount of excavated matter is loaded on the second vehicle 22, the excavated matter is conveyed toward the third vehicle 23 from the belt conveyor 9 through the first conveyor 31 and the second conveyor 32 (directions of the arrows W13, W14, and W15 in the diagram). Next, excavated matter is loaded into the accommodation space of the carrier of the third vehicle 23. When excavated matter has risen locally inside the accommodation space, the excavated matter inside the accommodation space is leveled from above by moving the blade 52. In this manner, excavated matter conveyed from the belt conveyor 9 is loaded on the third vehicle 23.

As above, excavated matter can be loaded on the first vehicle 21, the second vehicle 22, and the third vehicle 23.

Operational Effects

As described above, the excavated matter conveyance system 1 inside a driftway according to the present embodiment includes the first vehicle 21 that is capable of traveling inside a driftway, the first conveyor 31 that is supported by the upper portion of the first vehicle 21 and is capable of conveying excavated matter in the first conveyance direction V1 orthogonal to the upward-downward direction of the first vehicle 21, the second vehicle 22 that is coupled to the first vehicle 21 in a swingable manner, the second conveyor 32 that is supported by the upper portion of the second vehicle 22 and is capable of conveying excavated matter in the second conveyance direction V2 orthogonal to the upward-downward direction of the second vehicle 22, and the movement apparatuses 40 that are capable of relatively moving the first conveyor 31 and the second conveyor 32.

According to this constitution, the first conveyor 31 and the second conveyor 32 can be relatively moved by the movement apparatuses 40. For this reason, even when the first vehicle 21 and the second vehicle 22 travel in a curved driftway, disposition of the first conveyor 31 and the second conveyor 32 can be changed in accordance with the curved part of the driftway. Therefore, excavated matter can be efficiently conveyed even inside a driftway including a curved driftway.

In the present embodiment, the movement apparatus 40 each include the first longitudinal movement mechanism 120 that is capable of moving the first conveyor 31 in the longitudinal direction of the first conveyor 31, and the second longitudinal movement mechanism that is capable of moving the second conveyor 32 in the longitudinal direction of the second conveyor 32.

According to this constitution, the first conveyor 31 can be moved in the longitudinal direction of the first conveyor 31 by the first longitudinal movement mechanism 120, and the second conveyor 32 can be moved in the longitudinal direction of the second conveyor 32 by the second longitudinal movement mechanism. For this reason, even when the first vehicle 21 and the second vehicle 22 travel in a curved driftway, positional deviation of the first conveyor 31 and the second conveyor 32 in the longitudinal direction can be absorbed. Therefore, excavated matter can be efficiently conveyed even inside a driftway including a curved driftway.

In the present embodiment, the movement apparatuses 40 each include the first lateral movement mechanism 130 that is capable of moving the first conveyor 31 in the width direction of the first vehicle 21, and the second lateral movement mechanism that is capable of moving the second conveyor 32 in the width direction of the second vehicle 22.

According to this constitution, the first conveyor 31 can be moved in the width direction of the first vehicle 21 by the first lateral movement mechanism 130, and the second conveyor 32 can be moved in the width direction of the second vehicle 22 by the second lateral movement mechanism. For this reason, even when the first vehicle 21 and the second vehicle 22 travel in a curved driftway, positional deviation of the first conveyor 31 and the second conveyor 32 with respect to the width direction of the first vehicle 21 and the second vehicle 22 can be absorbed. Therefore, excavated matter can be efficiently conveyed even inside a driftway including a curved driftway.

In the present embodiment, the first inclination angle K1 formed by a surface of the first vehicle 21 which is orthogonal to the upward-downward direction and the conveyance surface on which the first conveyor 31 conveys excavated matter in the first conveyance direction V1 is the same angle as the second inclination angle K2 formed by a surface of the second vehicle 22 which is orthogonal to the upward-downward direction and the conveyance surface on which the second conveyor 32 conveys excavated matter in the second conveyance direction V2.

According to this constitution, compared to when the first inclination angle K1 is an angle different from the second inclination angle K2, excavated matter can be smoothly conveyed from the first conveyor 31 to the second conveyor 32.

In the present embodiment, the upper end 32*a* of the second conveyor 32 on the first vehicle 21 side is disposed on a side below the lower end 31*a* of the first conveyor 31 on the second vehicle 22 side.

According to this constitution, when the first conveyor 31 and the second conveyor 32 are relatively moved, interference between the first conveyor 31 and the second conveyor 32 can be avoided. Furthermore, when excavated matter is conveyed from the first conveyor 31 to the second conveyor 32, excavated matter can be efficiently conveyed utilizing falling of excavated matter.

In the present embodiment, the movement apparatuses 40 each include the first turning mechanism 140 that is capable of turning the first conveyor 31 about the first axis D1 in the upward-downward direction of the first vehicle 21, and the second turning mechanism that is capable of turning the second conveyor 32 about the second axis D2 in the upward-downward direction of the second vehicle 22.

According to this constitution, the first conveyor 31 can be turned about the first axis D1 by the first turning mechanism 140, and the second conveyor 32 can be turned about the second axis D2 by the second turning mechanism. For this reason, even when the first vehicle 21 and the second vehicle 22 travel in a curved driftway, positional deviation of the first conveyor 31 and the second conveyor 32 in a turning direction can be absorbed. Therefore, excavated matter can be efficiently conveyed even inside a driftway including a curved driftway.

In the present embodiment, the movement apparatuses 40 each include the first hydraulic cylinders 131L and 131R that couples the first vehicle 21 and the first conveyor 31 to each other such that the first conveyor 31 is movable in a direction orthogonal to the upward-downward direction of the first vehicle 21, and the second hydraulic cylinder that couples the second vehicle 22 and the second conveyor 32 to each other such that the second conveyor 32 is movable in a direction orthogonal to the upward-downward direction of the second vehicle 22.

According to this constitution, the first conveyor 31 can be moved in a direction orthogonal to the upward-downward direction of the first vehicle 21 by the first hydraulic cylinders 131L and 131R, and the second conveyor 32 can be moved in a direction orthogonal to the upward-downward direction of the second vehicle 22 by the second hydraulic cylinder. For this reason, compared to when a drive mechanism such as belt driving or chain driving is provided, the number of components can be reduced, and the constitution can be simplified.

In the present embodiment, the first vehicle 21 and the second vehicle 22 include the blade 52 that is capable of leveling loaded excavated matter from above.

According to this constitution, when excavated matter is loaded on the first vehicle 21 and the second vehicle 22, local rising of excavated matter can be curbed. Therefore, excavated matter can be efficiently loaded on the first vehicle 21 and the second vehicle 22.

In the present embodiment, the height H1 of the first vehicle 21 is larger than the height H2 of the second vehicle 22.

According to this constitution, compared to when the height H1 of the first vehicle 21 is a height equal to or smaller than the height H2 of the second vehicle 22, it is easy for the upper end 32*a* of the second conveyor 32 on the first vehicle 21 side to be disposed below the lower end 31*a* of the first conveyor 31 on the second vehicle 22 side.

In the present embodiment, the lowermost stream end 31*b* of the first conveyor 31 in the first conveyance direction V1 is disposed on a side behind the uppermost stream end 32*b* of the second conveyor 32 in the second conveyance direction V2.

According to this constitution, when excavated matter is conveyed from the first conveyor 31 to the second conveyor 32, the excavated matter conveyed from the first conveyor 31 falls on the second conveyor 32. Therefore, excavated matter can be more efficiently conveyed utilizing falling of the excavated matter.

In the present embodiment, the first vehicle 21 and the second vehicle 22 include the bogie mechanisms 53A and 53B capable of turning the wheels of the first vehicle 21 and the second vehicle 22 in a direction orthogonal to the upward-downward direction of the first vehicle 21 and the second vehicle 22.

According to this constitution, the wheels of the first vehicle 21 and the second vehicle 22 can be turned in a direction orthogonal to the upward-downward direction of the first vehicle 21 and the second vehicle 22 by the bogie mechanisms 53A and 53B. For this reason, even when the first vehicle 21 and the second vehicle 22 travel in a curved driftway, the wheels of the first vehicle 21 and the second vehicle 22 can be independently turned in a direction orthogonal to the upward-downward direction of the first vehicle 21 and the second vehicle 22. Therefore, the first vehicle 21 and the second vehicle 22 can smoothly travel even inside a driftway including a curved driftway.

In the present embodiment, the excavated matter conveyance system 1 inside a driftway includes the rails 90L and 90R that support the wheels of the first vehicle 21 and the second vehicle 22, and a plurality of road decking panels 91 and 92 that are divided with the rails 90L and 90R as boundaries and are disposed at heights equal to or higher than the upper ends of the rails 90L and 90R in the vertical direction.

For example, for instance, when the plurality of road decking panels 91 and 92 are disposed lower than the upper ends of the rails 90L and 90R in the vertical direction, there is a probability that the rails 90L and 90R will obstruct traveling of other vehicles such as general vehicles, wheel-type material/equipment conveyance vehicles, and vehicles for moving people. In contrast, in the present embodiment, since the plurality of road decking panels 91 and 92 are disposed at heights equal to or higher than the upper ends of the rails 90L and 90R in the vertical direction, the rails 90L and 90R do not obstruct traveling of other vehicles. Therefore, both traveling of the first vehicle 21 and the second vehicle 22 on the rails 90L and 90R can be compatible with traveling of other vehicles on the road decking panels 91 and 92.

Furthermore, in the present embodiment, each of the upper surfaces of the plurality of road decking panels 91 and 92 is disposed on the same flat surface. For this reason, compared to when each of the upper surfaces of the plurality of road decking panels 91 and 92 is disposed on a different flat surface, other vehicles can smoothly travel on the plurality of road decking panels 91 and 92.

In the present embodiment, the bottom wall 61 of the carrier 50 has the discharge hole for discharging excavated matter inside the accommodation space 60.

According to this constitution, since a bottom dumping type is employed, excavated matter inside the accommodation space 60 can fall in the downward direction so that dumping can be efficiently performed. Furthermore, even when the conveyor is supported by the upper portion of the vehicle, it is favorable because it does not interfere with discharging of excavated matter.

Second Embodiment

Figure 12:
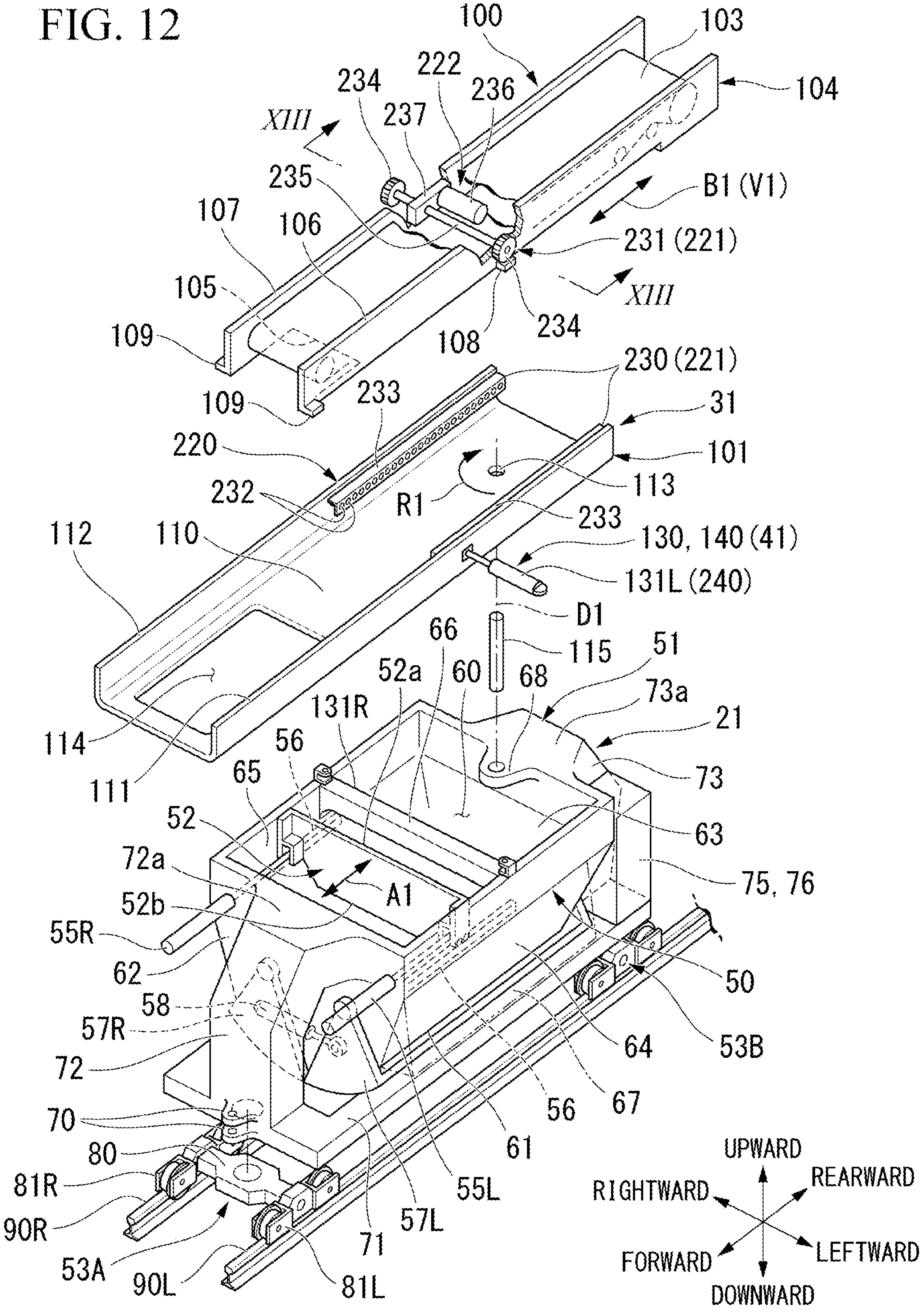
FIG. 12 is an exploded perspective view of the first vehicle, the first conveyor, and the first movement mechanism according to a second embodiment.

In the first embodiment, an example in which the first longitudinal movement mechanism 120 includes the longitudinal movement hydraulic cylinders 121L and 121R extending in the longitudinal direction of the support bottom plate 110 (refer to FIG. 4) has been described. As shown in FIG. 12, a second embodiment differs from the first embodiment in that a first longitudinal movement mechanism 220 includes a rack and pinion mechanism 221 and a drive device 222. The rack and pinion mechanism 221 can move the first conveyor 31 in the longitudinal direction of the first conveyor 31 in response to driving of the drive device 222. In the following description, the same reference signs are applied to constitutions similar to those in the first embodiment, and a description will be omitted.

Figure 13:
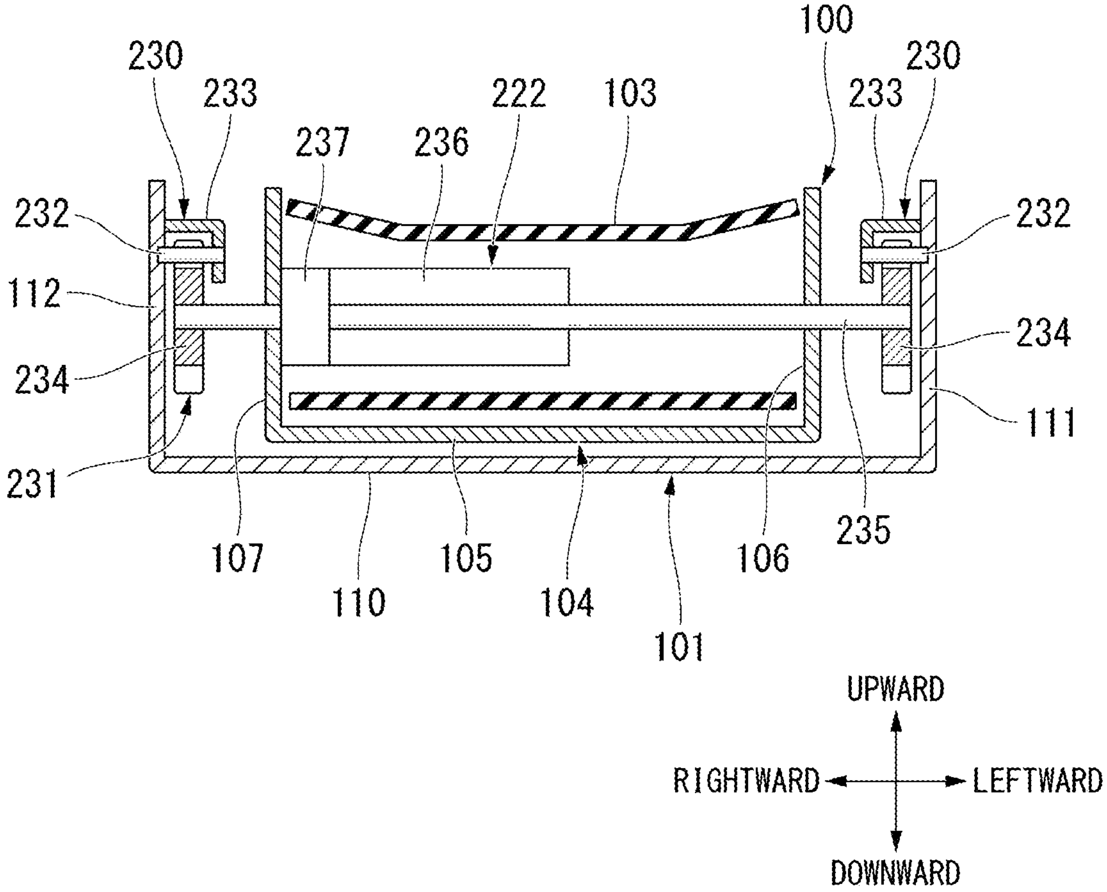
FIG. 13 is a view including a cross section along XIII-XIII in FIG. 12.

FIG. 12 is an exploded perspective view of the first vehicle, the first conveyor, and the first movement mechanism according to the second embodiment. FIG. 13 is a view including a cross section along XIII-XIII in FIG. 12.

As shown in FIG. 12, the rack and pinion mechanism 221 includes rack mechanisms 230 and a pinion mechanism 231. A pair of rack mechanisms 230 are provided with a gap therebetween in the transverse direction of the support bottom plate 110. The pair of rack mechanisms 230 are disposed at the same height positions as each other (positions in the vehicle upward-downward direction). The rack mechanisms 230 are coupled to the first support side plate 111 and the second support side plate 112.

As shown in FIG. 13, the rack mechanisms 230 each include a pin gear 232 and a gear support member 233. The gear support members 233 extend in the longitudinal direction of the first support side plate 111 and the second support side plate 112. In the cross-sectional view of FIG. 13, the gear support members 233 have an L-shape. The gear support members 233 are coupled to inner side surfaces of the first support side plate 111 and the second support side plate 112. The pin gears 232 extend parallel to the transverse direction of the support bottom plate 110. A plurality of pin gears 232 are disposed with a gap therebetween in the longitudinal direction of the gear support members 233.

The pinion mechanism 231 includes pinion gears 234 and a shaft 235. The pinion gears 234 mesh with the pin gears 232. A pair of pinion gears 234 are provided correspondingly to the pair of rack mechanisms 230. The shaft 235 couples the pair of pinion gears 234 to each other. The shaft 235 extends parallel to the transverse direction of the support bottom plate 110. The shaft 235 is supported at a fixed position with respect to the longitudinal direction of the conveyor frame 104.

In the cross-sectional view of FIG. 13, the shaft 235 and the drive device 222 are disposed in the upward-downward direction of the conveyor main body 103. In the cross-sectional view of FIG. 13, the drive device 222 is disposed in the transverse direction of the conveyor frame 104.

The drive device 222 includes a motor 236 and a power transmission mechanism 237.

The motor 236 extends parallel to the shaft 235. The motor 236 includes an output shaft capable of rotating around an axis parallel to the shaft 235. The output shaft of the motor 236 is connected to the shaft 235 through the power transmission mechanism 237.

The power transmission mechanism 237 is coupled to the first conveyor second side plate 107 of the conveyor frame 104. The power transmission mechanism 237 transmits rotation power of the output shaft of the motor 236 to the shaft 235. The pinion gears 234 rotate integrally with the shaft 235 in response to rotation of the output shaft of the motor 236. When the pinion gears 234 rotate in response to driving of the motor 236 and mesh with the plurality of pin gears 232, the conveyor unit 100 moves in the direction of the arrow B1 in FIG. 12 along the support frame 101.

In the first embodiment, an example in which a pair of first hydraulic cylinders 131L and 131R are provided with a gap therebetween in the width direction of the first vehicle 21 (refer to FIG. 4) has been described. In the second embodiment, as shown in FIG. 12, the first hydraulic cylinder 131L is provided on only one side in the width direction of the first vehicle 21. The first hydraulic cylinder 131L couples the upper portion of the left wall 64 of the carrier 50 and the support frame 101 to each other.

In the example of the diagram, the first hydraulic cylinder 131L extends in the width direction of the first vehicle 21. The first end portion (piston rod tip portion) of the first hydraulic cylinder 131L in the longitudinal direction is coupled to a part in the vicinity of the central portion of the first support side plate 111 in the longitudinal direction. The first end portion of the first hydraulic cylinder 131L in the longitudinal direction can turn about an axis in the upward-downward direction in the coupling part of the first support side plate 111.

The second end portion (the end portion on a side opposite to the piston rod tip portion) of the first hydraulic cylinder 131L in the longitudinal direction is coupled to the upper end portion of the left wall 64 of the carrier 50. The second end portion of the first hydraulic cylinder 131L in the longitudinal direction can turn about an axis in the upward-downward direction in the coupling part of the left wall 64.

The first hydraulic cylinder 131L is driven by means of an operating fluid supplied from the hydraulic pump. The first conveyor 31 turns about the first axis D1 in response to driving of the first hydraulic cylinder 131L. For example, if the first hydraulic cylinder 131L extends longer than a predetermined length, the first conveyor 31 turns about the first axis D1 in the direction of the arrow R1. Meanwhile, if the first hydraulic cylinder 131L contracts shorter than the predetermined length, the first conveyor 31 turns about the first axis D1 in a direction opposite to the direction of the arrow R1. In this manner, even when only one first hydraulic cylinder 131L is provided, the first conveyor 31 can turn about the first axis D1.

Operational Effects

In the second embodiment, the first longitudinal movement mechanism 120 includes the rack and pinion mechanism 221 and the drive device 222. The rack and pinion mechanism 221 can move the first conveyor 31 in the longitudinal direction of the first conveyor 31 in response to driving of the drive device 222.

According to this constitution, the first conveyor 31 can be moved in the longitudinal direction of the first conveyor 31 by the rack and pinion mechanism 221. For this reason, even when the first vehicle 21 and the second vehicle 22 travel in a curved driftway, positional deviation of the first conveyor 31 and the second conveyor 32 in the longitudinal direction can be absorbed. Therefore, excavated matter can be efficiently conveyed even inside a driftway including a curved driftway.

For example, for instance, when one hydraulic cylinder is disposed on the centerline of the support frame 101 in the transverse direction, a space for disposing the hydraulic cylinder is required between the support frame 101 and the conveyor unit 100 in the upward-downward direction, and therefore there is a probability that the height of the first conveyor 31 will increase. In contrast, in the second embodiment, by disposing the rack and pinion mechanism 221, a space for disposing a hydraulic cylinder is not required between the support frame 101 and the conveyor unit 100 in the upward-downward direction. Therefore, increase in height of the first conveyor 31 can be curbed.

In the second embodiment, the first hydraulic cylinder 131L is provided on only one side in the width direction of the first vehicle 21.

According to this constitution, compared to when a pair of the first hydraulic cylinders 131L and 131R are provided (refer to FIG. 4), the number of components can be reduced, and the constitution can be simplified.

Other Embodiments

In the embodiments described above, an example in which the excavated matter conveyance system inside a driftway includes the first conveyor that is capable of conveying excavated matter in the first conveyance direction orthogonal to the upward-downward direction of the first vehicle, and the second conveyor that is capable of conveying excavated matter in the second conveyance direction orthogonal to the upward-downward direction of the second vehicle has been described, but the embodiments are not limited to this. For example, the first conveyor may be capable of conveying excavated matter in the first conveyance direction obliquely intersecting the upward-downward direction of the first vehicle. For example, the second conveyor may be capable of conveying excavated matter in the second conveyance direction obliquely intersecting the upward-downward direction of the second vehicle. For example, the excavated matter conveyance system inside a driftway need only include the first conveyor that is capable of conveying excavated matter in the first conveyance direction intersecting the upward-downward direction of the first vehicle, and the second conveyor that is capable of conveying excavated matter in the second conveyance direction intersecting the upward-downward direction of the second vehicle. For example, the form of conveying excavated matter in the first conveyor and the second conveyor can be changed in accordance with required specifications.

In the embodiments described above, an example in which the movement apparatus includes the first longitudinal movement mechanism that is capable of moving the first conveyor in the longitudinal direction of the first conveyor, and the second longitudinal movement mechanism that is capable of moving the second conveyor in the longitudinal direction of the second conveyor has been described, but the embodiments are not limited to this. For example, the movement apparatus may not include the first longitudinal movement mechanism and the second longitudinal movement mechanism. For example, the movement apparatus may include a movement mechanism that is capable of moving the first conveyor and the second conveyor in a direction intersecting the longitudinal direction of the first conveyor and the second conveyor. For example, the constitution form of the movement apparatus can be changed in accordance with required specifications.

In the embodiments described above, an example in which the movement apparatus includes the first lateral movement mechanism that is capable of moving the first conveyor in the width direction of the first vehicle, and the second lateral movement mechanism that is capable of moving the second conveyor in the width direction of the second vehicle has been described, but the embodiments are not limited to this. For example, the movement apparatus may include a movement mechanism that is capable of moving the first conveyor and the second conveyor in a direction intersecting the width direction of the first vehicle and the second vehicle. For example, the constitution form of the movement apparatus can be changed in accordance with required specifications.

In the embodiments described above, an example in which the first inclination angle formed by a surface of the first vehicle which is orthogonal to the upward-downward direction and the conveyance surface on which the first conveyor conveys excavated matter in the first conveyance direction is the same angle as the second inclination angle formed by a surface of the second vehicle which is orthogonal to the upward-downward direction and the conveyance surface on which the second conveyor conveys excavated matter in the second conveyance direction has been described, but the embodiments are not limited to this. For example, the first inclination angle may be an angle different from the second inclination angle. For example, the first inclination angle and the second inclination angle can be changed in accordance with required specifications.

In the embodiments described above, an example in which the upper end of the second conveyor on the first vehicle side is disposed below the lower end of the first conveyor on the second vehicle side has been described, but the embodiments are not limited to this. For example, the upper end of the second conveyor on the first vehicle side may not be disposed below the lower end of the first conveyor on the second vehicle side. For example, the upper end of the second conveyor on the first vehicle side may be disposed above the lower end of the first conveyor on the second vehicle side. For example, the disposition form of the first conveyor and the second conveyor can be changed in accordance with required specifications.

In the embodiments described above, an example in which the movement apparatus includes the first turning mechanism that is capable of turning the first conveyor about the first axis in the upward-downward direction of the first vehicle, and the second turning mechanism that is capable of turning the second conveyor about the second axis in the upward-downward direction of the second vehicle has been described, but the embodiments are not limited to this. For example, the movement apparatus may not include the first turning mechanism and the second turning mechanism. For example, the movement apparatus may include a movement mechanism capable of moving the first conveyor and the second conveyor in a tangential direction (one predetermined direction) in the turning direction of the first conveyor and the second conveyor. For example, the constitution form of the movement apparatus can be changed in accordance with required specifications.

In the embodiments described above, an example in which the movement apparatus includes the first hydraulic cylinder that couples the first vehicle and the first conveyor to each other such that the first conveyor is movable in a direction orthogonal to the upward-downward direction of the first vehicle, and the second hydraulic cylinder that couples the second vehicle and the second conveyor to each other such that the second conveyor is movable in a direction orthogonal to the upward-downward direction of the second vehicle has been described, but the embodiments are not limited to this. For example, the first hydraulic cylinder and the second hydraulic cylinder may not be provided. For example, the movement apparatus may include a drive mechanism such as belt driving or chain driving. For example, the constitution form of the movement apparatus can be changed in accordance with required specifications.

In the embodiments described above, an example in which the first vehicle and the second vehicle include a blade that is capable of leveling loaded excavated matter from above has been described, but the embodiments are not limited to this. For example, the first vehicle and the second vehicle may not include a blade. For example, the constitution form of the first vehicle and the second vehicle can be changed in accordance with required specifications.

In the embodiments described above, an example in which the height of the first vehicle is larger than the height of the second vehicle has been described, but the embodiments are not limited to this. For example, the height of the first vehicle may not be larger than the height of the second vehicle. For example, the height of the first vehicle may be a height equal to or smaller than the height of the second vehicle. For example, the heights of the first vehicle and the second vehicle can be changed in accordance with required specifications.

In the embodiments described above, an example in which the lowermost stream end of the first conveyor in the first conveyance direction is disposed on a side behind the uppermost stream end of the second conveyor in the second conveyance direction has been described, but the embodiments are not limited to this. For example, the lowermost stream end of the first conveyor in the first conveyance direction may not be disposed on a side behind the uppermost stream end of the second conveyor in the second conveyance direction. For example, the lowermost stream end of the first conveyor in the first conveyance direction may be disposed on a side in front of the uppermost stream end of the second conveyor in the second conveyance direction. For example, the disposition form of the first conveyor and the second conveyor can be changed in accordance with required specifications.

In the embodiments described above, an example in which the first vehicle and the second vehicle include bogie mechanisms that are capable of turning the wheels of the first vehicle and the second vehicle in a direction orthogonal to the upward-downward direction of the first vehicle and the second vehicle has been described, but the embodiments are not limited to this. For example, the first vehicle and the second vehicle may not include bogie mechanisms. For example, the constitution form of the first vehicle and the second vehicle can be changed in accordance with required specifications.

In the embodiments described above, an example in which the excavated matter conveyance system inside a driftway includes the rails that support the wheels of the first vehicle and the second vehicle, and a plurality of road decking panels that are divided with the rails as boundaries and are disposed at heights equal to or higher than the upper ends of the rails in the vertical direction has been described, but the embodiments are not limited to this. For example, the excavated matter conveyance system inside a driftway may not include rails and a plurality of road decking panels. For example, the constitution form of the excavated matter conveyance system inside a driftway can be changed in accordance with required specifications.

In the embodiments described above, an example in which a plurality of road decking panels are disposed at heights equal to or higher than the upper ends of the rails in the vertical direction has been described, but the embodiments are not limited to this. For example, the plurality of road decking panels may not be disposed at heights equal to or higher than the upper ends of the rails in the vertical direction. For example, the plurality of road decking panels may be disposed lower than the upper ends of the rails in the vertical direction. For example, the disposition form of a plurality of road decking panels with respect to the upper ends of the rails in the vertical direction can be changed in accordance with required specifications.

In the embodiments described above, an example in which each of the upper surfaces of the plurality of road decking panels is disposed on the same flat surface has been described, but the embodiments are not limited to this. For example, each of the upper surfaces of the plurality of road decking panels may not be disposed on the same flat surface. For example, each of the upper surfaces of the plurality of road decking panels may be disposed on a different flat surface. For example, the disposition form of the upper surfaces of the plurality of road decking panels can be changed in accordance with required specifications.

In the embodiments described above, an example in which the first conveyance vehicle group is constituted of seven vehicles in total including the first vehicle to the seventh vehicle has been described, but the embodiments are not limited to this. For example, the first conveyance vehicle group may be constituted of six or fewer vehicles or eight or more vehicles. For example, the number of vehicles constituting the first conveyance vehicle group can be changed in accordance with required specifications.

In the embodiments described above, an example in which the second conveyance vehicle group is constituted of three vehicles in total including the first vehicle to the third vehicle has been described, but the embodiments are not limited to this. For example, the second conveyance vehicle group may be constituted of only the first vehicle and the second vehicle or may be constituted of four or more vehicles including a fourth vehicle and so on. For example, the number of vehicles constituting the second conveyance vehicle group can be changed in accordance with required specifications.

In the embodiments described above, an example in which in the second vehicle, the second pivot member turnably supporting the second conveyor is provided on the front side of the carrier has been described, but the embodiments are not limited to this. For example, in the second vehicle, the second pivot member turnably supporting the second conveyor may be provided on the rear side of the carrier. For example, the second pivot member may be disposed on the same side as the pivot member of the first vehicle in the forward-rearward direction. For example, the disposition form of the pivot members in the first vehicle and the second vehicle can be changed in accordance with required specifications.

Hereinabove, the embodiments of the present invention have been described, but the present invention is not limited to these. Addition, omission, replacement, and other changes of the constitutions can be made within a range not departing from the gist of the present invention, and the embodiments described above can also be suitably combined.

BRIEF DESCRIPTION OF THE REFERENCE SYMBOLS

1 Excavated matter conveyance system
21 First vehicle
22 Second vehicle
31 First conveyor
31*a* Lower end of first conveyor on second vehicle side
31*b* Lowermost stream end of first conveyor in first conveyance direction
32 Second conveyor
32*a* Upper end of second conveyor on first vehicle side
32*b* Uppermost stream end of second conveyor in second conveyance direction
40, 240 Movement apparatus
52 Blade
53A Bogie mechanism for front wheel (bogie mechanism)
53B Bogie mechanism for rear wheel (bogie mechanism)
85L, 85R Front side front wheel (wheel)
86L, 86R Rear side front wheel (wheel)
87L, 87R Front side rear wheel (wheel)
88L, 88R Rear side rear wheel (wheel)
90 Rail
91 Center block (road decking panel)
92L, 92R Side block (road decking panel)
120, 220 First longitudinal movement mechanism (second longitudinal movement mechanism)
130 First lateral movement mechanism (second lateral movement mechanism)
131L, 131R First hydraulic cylinder (second hydraulic cylinder)
140 First turning mechanism
D1 First axis
D2 Second axis
H1 Height of first vehicle
H2 Height of second vehicle
K1 First inclination angle
K2 Second inclination angle
V1 First conveyance direction
V2 Second conveyance direction

The invention claimed is:

1. An excavated matter conveyance system inside a driftway comprising:
a first vehicle that is capable of traveling inside a driftway;
a first conveyor that is supported by an upper portion of the first vehicle and is capable of conveying excavated matter in a first conveyance direction intersecting an upward-downward direction of the first vehicle;
a second vehicle that is coupled to the first vehicle in a swingable manner;
a second conveyor that is supported by an upper portion of the second vehicle and is capable of conveying the excavated matter in a second conveyance direction intersecting an upward-downward direction of the second vehicle; and
movement apparatuses that are capable of relatively moving the first conveyor and the second conveyor,
wherein the movement apparatuses each include
a first hydraulic cylinder that couples the first vehicle and the first conveyor to each other such that the first conveyor is movable in a direction orthogonal to the upward-downward direction of the first vehicle, and
a second hydraulic cylinder that couples the second vehicle and the second conveyor to each other such that the second conveyor is movable in a direction orthogonal to the upward-downward direction of the second vehicle.

2. The excavated matter conveyance system inside a driftway according to claim 1,
wherein the movement apparatuses each include
a first longitudinal movement mechanism that is capable of moving the first conveyor in a longitudinal direction of the first conveyor, and
a second longitudinal movement mechanism that is capable of moving the second conveyor in a longitudinal direction of the second conveyor.

3. The excavated matter conveyance system inside a driftway according to claim 1,
wherein the movement apparatuses each include
a first lateral movement mechanism that is capable of moving the first conveyor in a width direction of the first vehicle, and
a second lateral movement mechanism that is capable of moving the second conveyor in a width direction of the second vehicle.

4. The excavated matter conveyance system inside a driftway according to claim 1,
wherein a first inclination angle formed by a surface of the first vehicle which is orthogonal to the upward-downward direction and a conveyance surface on which the first conveyor conveys the excavated matter in the first conveyance direction is the same angle as a second inclination angle formed by a surface of the second vehicle which is orthogonal to the upward-downward direction and a conveyance surface on which the second conveyor conveys the excavated matter in the second conveyance direction.

5. The excavated matter conveyance system inside a driftway according to claim 1, wherein an upper end of the second conveyor on the first vehicle side is disposed on a side below a lower end of the first conveyor on the second vehicle side.

6. The excavated matter conveyance system inside a driftway according to claim 1, wherein the movement apparatuses each include a first turning mechanism that is capable of turning the first conveyor about a first axis in the upward-downward direction of the first vehicle, and a second turning mechanism that is capable of turning the second conveyor about a second axis in the upward-downward direction of the second vehicle.

7. The excavated matter conveyance system inside a driftway according to claim 1, wherein the first vehicle and the second vehicle include a blade that is capable of leveling the loaded excavated matter from above.

8. The excavated matter conveyance system inside a driftway according to claim 1, wherein a height of the first vehicle is larger than a height of the second vehicle.

9. The excavated matter conveyance system inside a driftway according to claim 1, wherein a lowermost stream end of the first conveyor in the first conveyance direction is disposed on a side behind an uppermost stream end of the second conveyor in the second conveyance direction.

10. The excavated matter conveyance system inside a driftway according to claim 1, wherein the first vehicle and the second vehicle include bogie mechanisms that are capable of turning wheels of the first vehicle and the second vehicle in a direction orthogonal to the upward-downward direction of the first vehicle and the second vehicle.

11. The excavated matter conveyance system inside a driftway according to claim 1 further comprising:

a plurality of rails that support wheels of the first vehicle and the second vehicle; and a plurality of road decking panels that are divided with the plurality of rails as boundaries and are disposed at heights equal to or higher than upper ends of the plurality of rails in a vertical direction.

* * * * *